United States Patent
Sinha et al.

(10) Patent No.: US 11,892,180 B2
(45) Date of Patent: Feb. 6, 2024

(54) HVAC SYSTEM WITH AUTOMATED DEVICE PAIRING

(71) Applicant: Johnson Controls Tyco IP Holdings LLP, Milwaukee, WI (US)

(72) Inventors: Sudhi Sinha, Milwaukee, WI (US); Youngchoon Park, Brookfield, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 16/880,707

(22) Filed: May 21, 2020

(65) Prior Publication Data

US 2020/0284457 A1     Sep. 10, 2020

Related U.S. Application Data

(63) Continuation of application No. 15/400,926, filed on Jan. 6, 2017, now Pat. No. 10,684,033.

(51) Int. Cl.
  *F24F 11/30*   (2018.01)
  *F24F 11/63*   (2018.01)
  (Continued)

(52) U.S. Cl.
  CPC .............. *F24F 11/30* (2018.01); *F24F 11/61* (2018.01); *F24F 11/62* (2018.01); *F24F 11/63* (2018.01);
  (Continued)

(58) Field of Classification Search
  None
  See application file for complete search history.

(56) References Cited

U.S. PATENT DOCUMENTS

| 3,067,977 A | 12/1962 | Anderson et al. |
| 4,815,700 A | 3/1989 | Mohrfeld |

(Continued)

FOREIGN PATENT DOCUMENTS

| CN | 101415011 A | 4/2009 |
| CN | 102136099 A | 7/2011 |

(Continued)

OTHER PUBLICATIONS

International Search Report on PCT/US2017/052702, dated Nov. 27, 2017, 14 pages.

(Continued)

*Primary Examiner* — Jennifer L Norton
(74) *Attorney, Agent, or Firm* — Foley & Lardner LLP

(57) ABSTRACT

A heating, ventilation, and air conditioning (HVAC) system for a building includes a plurality of actuation devices operable to affect one or more variables in the building, a plurality of sensors configured to measure the variables affected by the actuation devices, and a controller. The controller is configured to operate the actuation devices to affect one or more of the measured variables by providing an actuation signal to the actuation devices and to receive sensor response signals from the sensors. The sensor response signals indicate an effect of the actuation signal on the measured variables. For each of the sensor response signals, the controller is configured to calculate a similarity metric indicating a similarity between the sensor response signal and the actuation signal. The controller is configured to automatically establish a device pairing including one of the actuation devices and one of the sensors based on the similarity metrics.

15 Claims, 10 Drawing Sheets

(51) Int. Cl.
*G05B 19/042* (2006.01)
*F24F 11/61* (2018.01)
*F24F 11/62* (2018.01)
*F24F 11/56* (2018.01)
*F24F 11/64* (2018.01)
*F24F 110/00* (2018.01)

(52) U.S. Cl.
CPC ............ *G05B 19/042* (2013.01); *F24F 11/56* (2018.01); *F24F 11/64* (2018.01); *F24F 2110/00* (2018.01); *G05B 2219/2614* (2013.01)

(56) References Cited

U.S. PATENT DOCUMENTS

| | | |
|---|---|---|
| 5,301,109 A | 4/1994 | Landauer et al. |
| 5,446,677 A | 8/1995 | Jensen et al. |
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,206,023 B1 | 3/2001 | Landers |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,024,336 B2 | 4/2006 | Salsbury et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,847,681 B2 | 12/2010 | Singhal et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,325,637 B2 * | 12/2012 | Salsbury ............... H04W 84/18 370/332 |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,770,020 B2 * | 9/2023 | Asp .................... F24F 11/30 715/735 |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0256661 A1 | 11/2005 | Salsbury et al. |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |

(56) References Cited

U.S. PATENT DOCUMENTS

| | | |
|---|---|---|
| 2006/0184479 A1 | 8/2006 | Levine |
| 2006/0200476 A1 | 9/2006 | Gottumukkala et al. |
| 2006/0224252 A1 | 10/2006 | Brindac et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0053513 A1 | 3/2007 | Hoffberg |
| 2007/0172135 A1 | 7/2007 | Song |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0231437 A1 | 9/2008 | Singhal et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2008/0294291 A1 | 11/2008 | Salsbury |
| 2009/0033513 A1 | 2/2009 | Salsbury et al. |
| 2009/0102640 A1* | 4/2009 | McFarland ......... H04L 12/2827 340/539.1 |
| 2009/0195349 A1 | 8/2009 | Frader-Thompson et al. |
| 2009/0261174 A1* | 10/2009 | Butler ................... F24F 11/30 236/51 |
| 2009/0271150 A1* | 10/2009 | Stluka ................ G05B 23/0232 702/182 |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0078423 A1 | 3/2012 | Zhou et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0090767 A1 | 4/2013 | Bruck et al. |
| 2013/0095868 A1 | 4/2013 | Salsbury et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0249710 A1 | 9/2013 | Johnson et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0289774 A1* | 10/2013 | Day ..................... G06F 16/358 700/276 |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0058539 A1 | 2/2014 | Park |
| 2014/0058567 A1 | 2/2014 | Matsuoka et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0181117 A1 | 6/2015 | Park et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0276237 A1 | 10/2015 | Daniels et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0327010 A1 | 11/2015 | Gottschalk et al. |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |

(56) References Cited

U.S. PATENT DOCUMENTS

| | | |
|---|---|---|
| 2016/0239000 A1* | 8/2016 | Yan .................. G06V 30/194 |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0279489 A1 | 9/2017 | Singh et al. |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gartner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0195748 A1 | 7/2018 | Sinha et al. |
| 2018/0198627 A1 | 7/2018 | Mullins |
| 2018/0203961 A1 | 7/2018 | Aisu et al. |
| 2018/0232423 A1 | 8/2018 | Park et al. |
| 2018/0232459 A1 | 8/2018 | Park et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042629 A1* | 2/2019 | Park .................. G06F 16/9024 |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0186768 A1 | 6/2019 | Edstrom et al. |
| 2019/0186770 A1 | 6/2019 | Saffre et al. |
| 2019/0187642 A1 | 6/2019 | Lee et al. |
| 2019/0200437 A1 | 6/2019 | Eves et al. |
| 2019/0268178 A1 | 8/2019 | Fairweather et al. |
| 2019/0310979 A1 | 10/2019 | Masuzaki et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0129459 A1* | 4/2022 | Park .................. G06F 16/22 |
| 2022/0138684 A1 | 5/2022 | Harvey |
| 2022/0171354 A1* | 6/2022 | Guthrie .................. G05B 15/02 |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0081721 A1* | 3/2023 | Park .................. G06F 16/288 |
| 2023/0083703 A1 | 3/2023 | Meiners |

FOREIGN PATENT DOCUMENTS

| | | |
|---|---|---|
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 156 858 A1 | 4/2017 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |

(56) References Cited

FOREIGN PATENT DOCUMENTS

| | | |
|---|---|---|
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/030968 A1 | 2/2018 |

OTHER PUBLICATIONS

U.S. Appl. No. 17/566,029, PASSIVELOGIC, INC.
U.S. Appl. No. 17/567,275, PASSIVELOGIC, INC.
U.S. Appl. No. 17/722,115, PASSIVELOGIC, INC.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. Ser. No. 201780003995.9 dated Apr. 8, 2021 (21 pages with English language translation).
Chinese Office action on CN Appl. Ser. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," Data'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.

(56) References Cited

OTHER PUBLICATIONS

International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. Ser. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).

\* cited by examiner

HVAC SYSTEM WITH AUTOMATED DEVICE PAIRING

CROSS-REFERENCE TO RELATED PATENT APPLICATION

This application is a continuation of U.S. patent application Ser. No. 15/400,926 filed Jan. 6, 2017, the entirety of which is incorporated by reference herein.

BACKGROUND

The present disclosure relates generally to heating, ventilation, and air conditioning (HVAC) systems for a building. The present disclosure relates more particularly to systems and methods for automatically establishing relationships between sensors and actuation devices in a building HVAC system.

Building HVAC systems typically include many different sensors and actuation devices. The sensors measure various environmental variables (e.g., temperature, humidity, air flow, etc.) and provide sensor readings to a controller. In a feedback control system, a controller uses the sensor readings to generate appropriate control signals for the actuation devices (e.g., chillers, boilers, valves, actuators, etc.) which operate to affect the environmental variables measured by the sensors. Some buildings have hundreds of sensors and actuation devices. It can be cumbersome, error prone, and time consuming to manually identify the associations between sensors and their corresponding actuation devices. Additionally, buildings evolve over time which can change existing relationships between sensors and actuation devices. For example, remodeling a building can break existing relationships between paired sensors and actuation devices or create new relationships that did not previously exist.

Some building HVAC systems record time series data (e.g., trend data, historical data, etc.) for various measured or calculated variables. Time series data can be used for many purposes including, for example, fault detection, benchmarking, executing queries, and other data analysis applications. Some data analysis applications compare two or more time series as part of the analysis. However, it can be difficult to compare time series to each other due to dimensional mismatches resulting from different sampling rates, different units of measurement, and other factors. Without the ability to accurately compare time series data, performing actions such as finding similar trends, executing queries on a broad data set, running diagnostic algorithms, conducting benchmarking, reporting on compliance across portfolio of systems or buildings, and other actions can be challenging.

SUMMARY

One implementation of the present disclosure is a heating, ventilation, and air conditioning (HVAC) system for a building. The HVAC system includes a number of actuation devices operable to affect one or more variables in the building, a number of sensors configured to measure the variables affected by the actuation devices, and a controller. The controller is configured to operate the actuation devices to affect one or more of the measured variables by providing an actuation signal to the actuation devices and to receive sensor response signals from the sensors. The sensor response signals indicate an effect of the actuation signal on the measured variables. For each of the sensor response signals, the controller is configured to calculate a similarity metric indicating a similarity between the sensor response signal and the actuation signal. The controller is configured to automatically establish a device pairing including one of the actuation devices and one of the sensors based on the similarity metrics.

In some embodiments, the device pairing defines a control relationship between the actuation device in the device pairing and the sensor in the device pairing. The control relationship can indicate that the actuation device in the device pairing is operable to control a variable measured by the sensor in the device pairing.

In some embodiments, the controller is configured to automatically create a feedback control loop including the actuation device in the device pairing and the sensor in the device pairing. The controller can use the feedback control loop to generate and provide control signals to the actuation device in the device pairing based on measurements received from the sensor in the device pairing.

In some embodiments, the controller is configured to calculate the similarity metrics based on differences between samples of the actuation signal and corresponding samples of each of the sensor response signals.

In some embodiments, the controller is configured to determine, for each of the sensor response signals, a delay time of the sensor response signal relative to the actuation signal. The controller can identify a sensor corresponding to the sensor response signal having a minimum of the delay times and can establish the device pairing such that the identified sensor is included in the device pairing.

In some embodiments, the controller is configured to generate an actuation signal time series including a plurality of samples of the actuation signal and generate a sensor response time series for each of the sensor response signals. Each sensor response time series may include a plurality of samples of one of the measured variables. In some embodiments, the controller calculates the similarity metrics by comparing the actuation signal time series to each of the sensor response time series.

In some embodiments, the controller is configured to detect a dimensional mismatch between the actuation signal time series and one or more of the sensor response time series and correct the dimensional mismatch by modifying at least one of the actuation signal time series and one or more of the sensor response time series.

In some embodiments, the controller is configured to apply a discrete cosine transformation (DCT) to the actuation signal and each of the sensor response signals. Each DCT may generate a plurality of DCT coefficients. The controller can calculate the similarity metrics by comparing the DCT coefficients resulting from the DCT of the actuation signal to DCT coefficients resulting from the DCT of each sensor response signal.

In some embodiments, the controller is configured to receive baseline sensor signals from each of the plurality of sensors. The baseline sensor signals may indicate values of the measured variables during a time period before the actuation signal is provided to the actuation devices. For each of the baseline sensor signals, the controller can calculate a similarity metric indicating a similarity between the baseline sensor signal and the actuation signal.

In some embodiments, the controller is configured to determine, for each of the plurality of sensors, whether the similarity metric calculated based on the sensor response signal indicates a greater similarity than the similarity metric calculated based on the baseline sensor signal. In some embodiments, the controller establishes the device pairing in response to a determination that the similarity metric calculated based on the sensor response signal indicates a greater similarity than the similarity metric calculated based on the baseline sensor signal.

Another implementation of the present disclosure is a method for establishing device pairings in a heating, ventilation, and air conditioning (HVAC) system for a building. The method includes operating one or more actuation devices to affect one or more measured variables in the building by providing an actuation signal to the actuation devices and receiving sensor response signals from a plurality of sensors configured to measure the variables affected by the actuation devices. The sensor response signals indicate an effect of the actuation signal on the measured variables. The method includes calculating a similarity metric for each of the sensor response signals. Each similarity metric indicates a similarity between the actuation signal and one of the sensor response signals. The method includes automatically establishing a device pairing including one of the actuation devices and one of the sensors based on the similarity metrics.

In some embodiments, the device pairing defines a control relationship between the actuation device in the device pairing and the sensor in the device pairing. The control relationship may indicate that the actuation device in the device pairing is operable to control a variable measured by the sensor in the device pairing.

In some embodiments, the method includes automatically creating a feedback control loop including the actuation device in the device pairing and the sensor in the device pairing. The method may include using the feedback control loop to generate and provide control signals to the actuation device in the device pairing based on measurements received from the sensor in the device pairing.

In some embodiments, the similarity metrics are calculated based on differences between samples of the actuation signal and corresponding samples of each of the sensor response signals.

In some embodiments, the method includes determining, for each of the sensor response signals, a delay time of the sensor response signal relative to the actuation signal. The method may include identifying a sensor corresponding to the sensor response signal having a minimum of the delay times and establishing the device pairing such that the identified sensor is included in the device pairing.

In some embodiments, the method includes generating an actuation signal time series including a plurality of samples of the actuation signal and generating a sensor response time series for each of the sensor response signals. Each sensor response time series may include a plurality of samples of one of the measured variables. The method may include calculating the similarity metrics by comparing the actuation signal time series to each of the sensor response time series.

In some embodiments, the method includes detecting a dimensional mismatch between the actuation signal time series and one or more of the sensor response time series and correcting the dimensional mismatch by modifying at least one of the actuation signal time series and one or more of the sensor response time series.

In some embodiments, the method includes applying a discrete cosine transformation (DCT) to the actuation signal and each of the sensor response signals. Each DCT may generate a plurality of DCT coefficients. The method may include calculating the similarity metrics by comparing the DCT coefficients resulting from the DCT of the actuation signal to DCT coefficients resulting from the DCT of each sensor response signal.

In some embodiments, the method includes receiving baseline sensor signals from each of the plurality of sensors. The baseline sensor signals may indicate values of the measured variables during a time period before the actuation signal is provided to the actuation devices. The method may include, for each of the baseline sensor signals, calculating a similarity metric indicating a similarity between the baseline sensor signal and the actuation signal.

In some embodiments, the method includes determining, for each of the plurality of sensors, whether the similarity metric calculated based on the sensor response signal indicates a greater similarity than the similarity metric calculated based on the baseline sensor signal. The method may include establishing the device pairing in response to a determination that the similarity metric calculated based on the sensor response signal indicates a greater similarity than the similarity metric calculated based on the baseline sensor signal.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Some embodiments will become more fully understood from the following detailed description, taken in conjunction with the accompanying drawings, wherein like reference numerals refer to like elements, in which.

DETAILED DESCRIPTION

Figure 1:
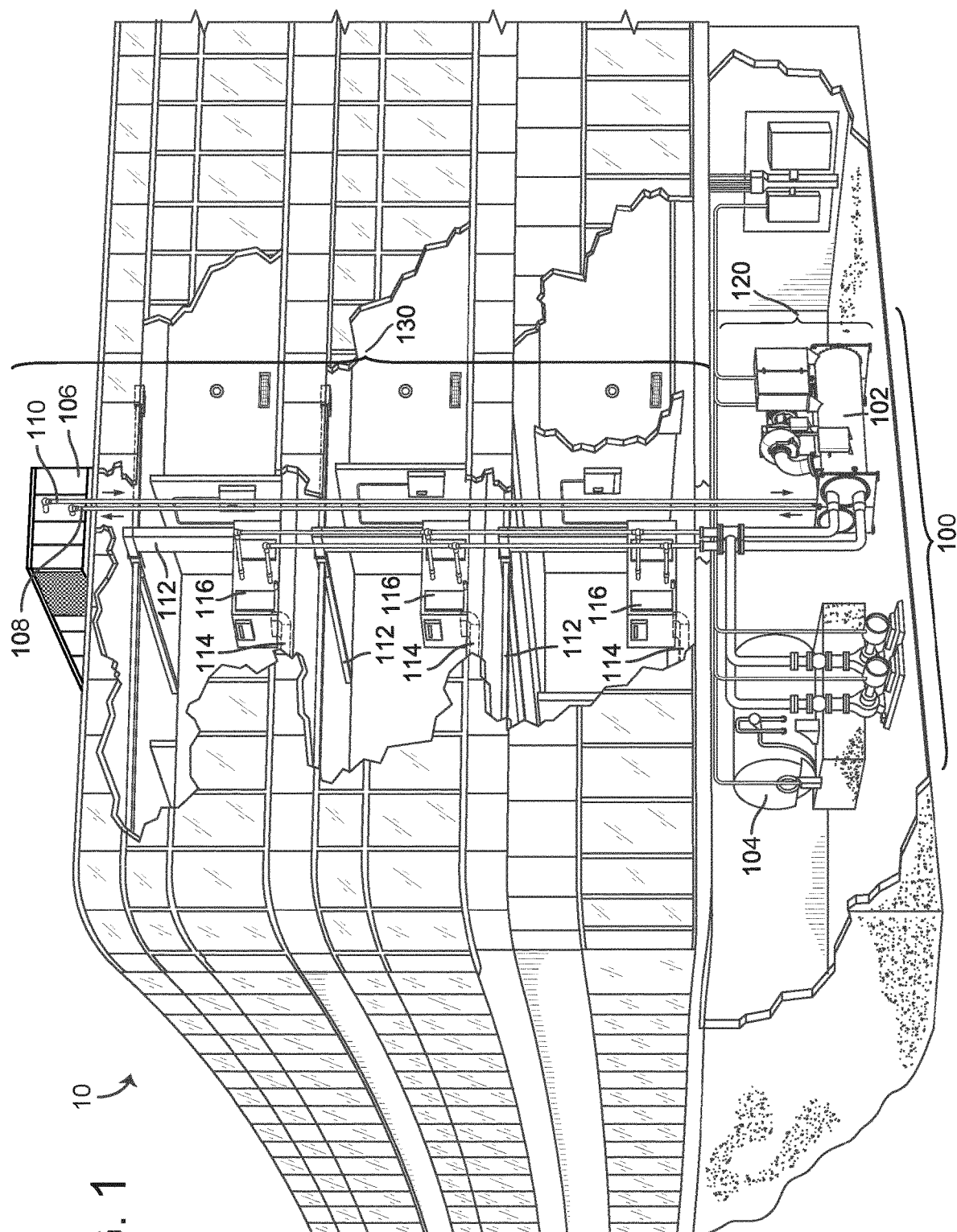
FIG. 1 is a drawing of a building equipped with a heating, ventilation, and air conditioning (HVAC) system, according to an exemplary embodiment.

Referring generally to the FIGURES, a heating, ventilation, and air conditioning (HVAC) system with automated device pairing and dimensional mismatch handling are shown according to various exemplary embodiments. The HVAC system includes a plurality of sensors and actuation devices (e.g., chillers, boilers, fans, dampers, actuators, valves, etc.). The sensors measure various environmental variables in the building (e.g., zone temperature, humidity, air flow, etc.). The actuation devices operate to affect the measured variables by providing heating, cooling, airflow, etc. to the building. A controller provides actuation signals to the actuation devices and receives sensor response signals from the sensors. The controller uses the sensor response signals to determine an effect of the actuation signals on the measured variables.

In some embodiments, the controller automatically establishes device pairings between sensors and actuation devices based on the sensor response signals. For each combination of an actuation signal and a sensor response signal, the controller can calculate a similarity metric. The similarity metric indicates the similarity or closeness between the sensor response signal and the actuation signal. The controller can use the similarity metrics to identify which of the sensor response signals most closely matches each actuation signal. The controller can then establish a device pairing between the actuation device and the sensor corresponding to the matching actuation signal and sensor response signal.

In some embodiments, the controller stores time series data for the actuation signals and sensor response signals. Different variables can be measured at different sampling rates, which can lead do dimensional mismatches between two or more time series that span the same range of times. For example, a time series sampled at a rate of ten samples per second may include twice the number of samples as a different time series sampled at a rate of five samples per second. The controller can automatically handle dimensional mismatches between two or more time series by performing a discrete cosine transformation for each time series.

A discrete cosine transformation (DCT) expresses a finite sequence of data points in terms of a sum of cosine functions oscillating at different frequencies. Performing the DCT may result in a set of DCT coefficients for each time series. The DCT coefficients represent the magnitudes of the cosine functions in the summation. The controller can apply a quantization process to the DCT coefficients in each set such that only a predetermined number of the DCT coefficients in each set are retained. The remaining DCT coefficients can be discarded or replaced with zeros, which has the effect of removing some of the higher frequency cosine functions from the summation. The controller can compare two or more time series by comparing the DCT coefficients resulting from each DCT. Advantageously, this allows for direct comparison between the transformed time series without requiring decompression, interpolation, synchronization, or other processing steps. Other features and advantages of the HVAC system and controller are described in greater detail below.

Building HVAC Systems and Building Management Systems

Figure 2:
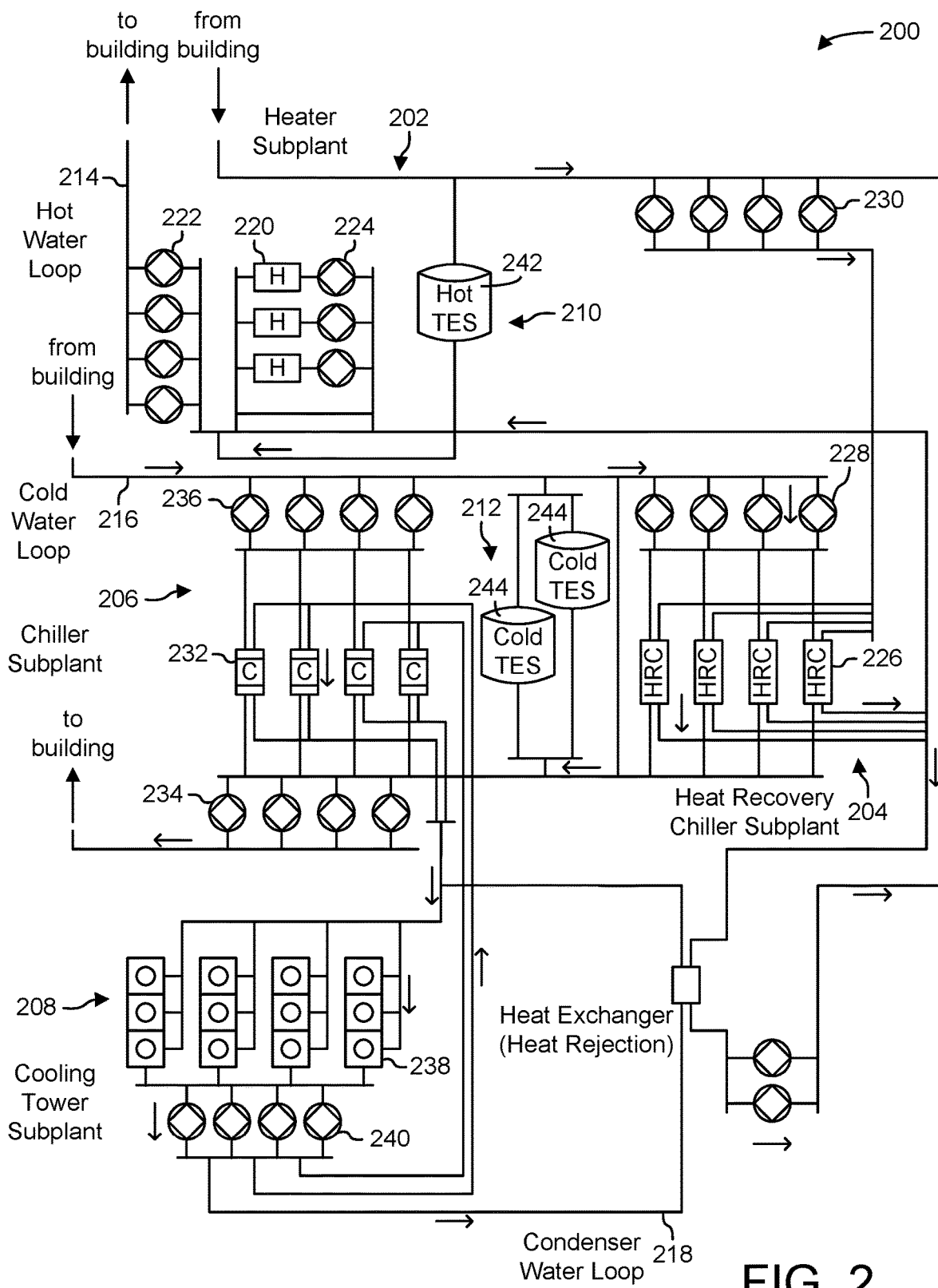
FIG. 2 is a drawing of a waterside system which can be used in combination with the HVAC system of FIG. 1, according to an exemplary embodiment.
Figure 3:
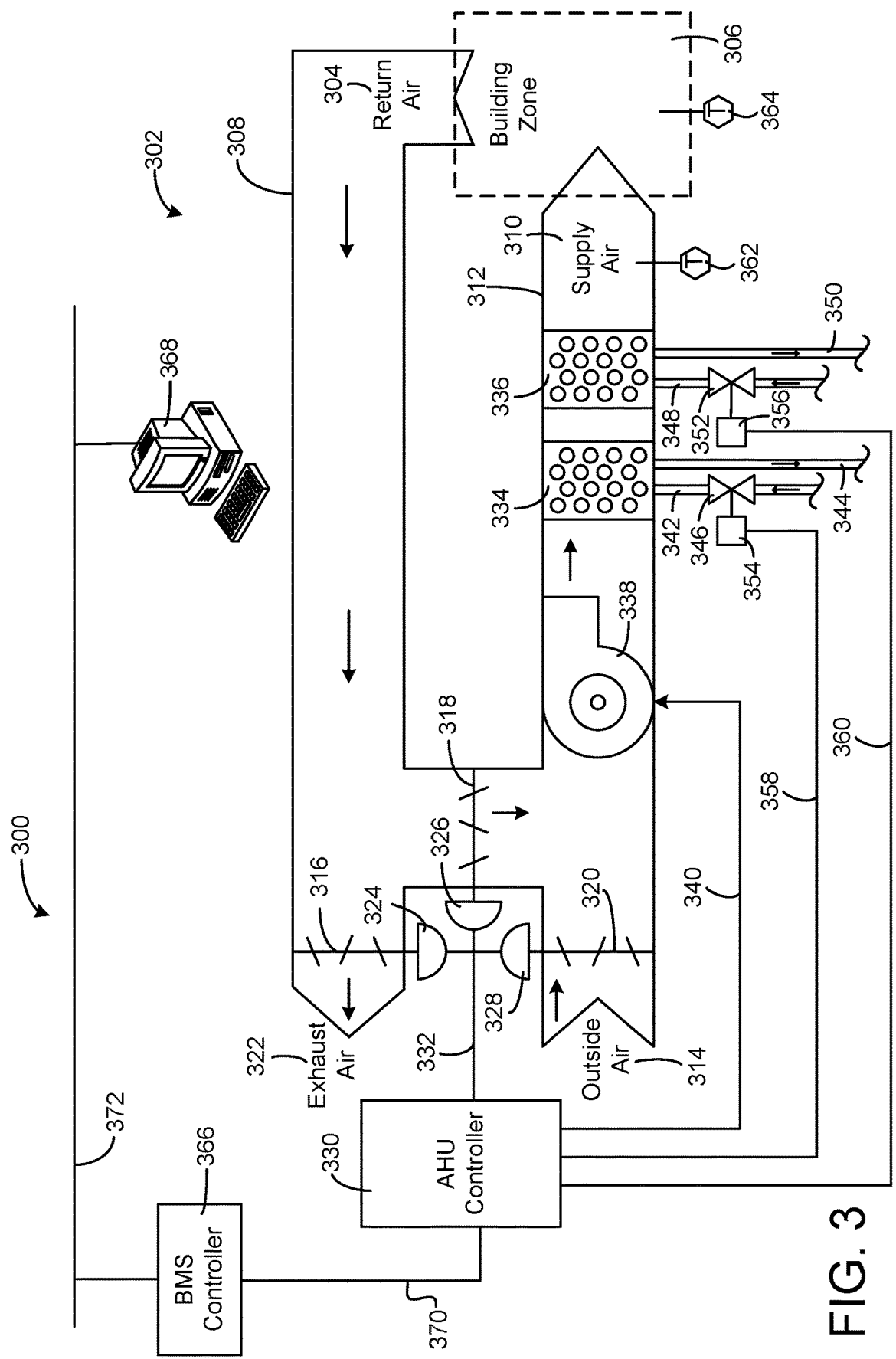
FIG. 3 is a drawing of an airside system which can be used in combination with the HVAC system of FIG. 1, according to an exemplary embodiment.
Figure 4:
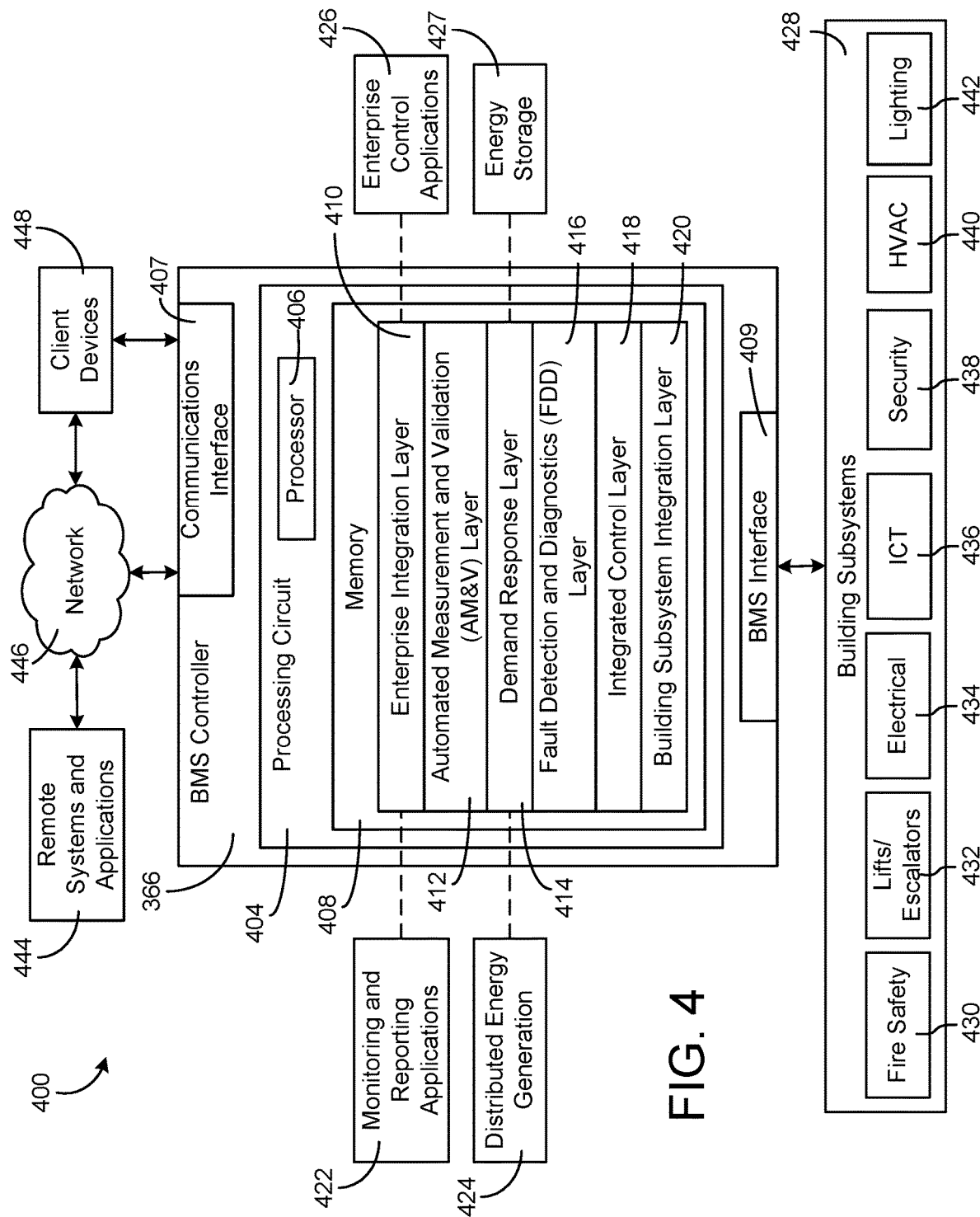
FIG. 4 is a block diagram of a building management system which can be used to monitor and control the building and HVAC system of FIG. 1, according to an exemplary embodiment.
Figure 5:
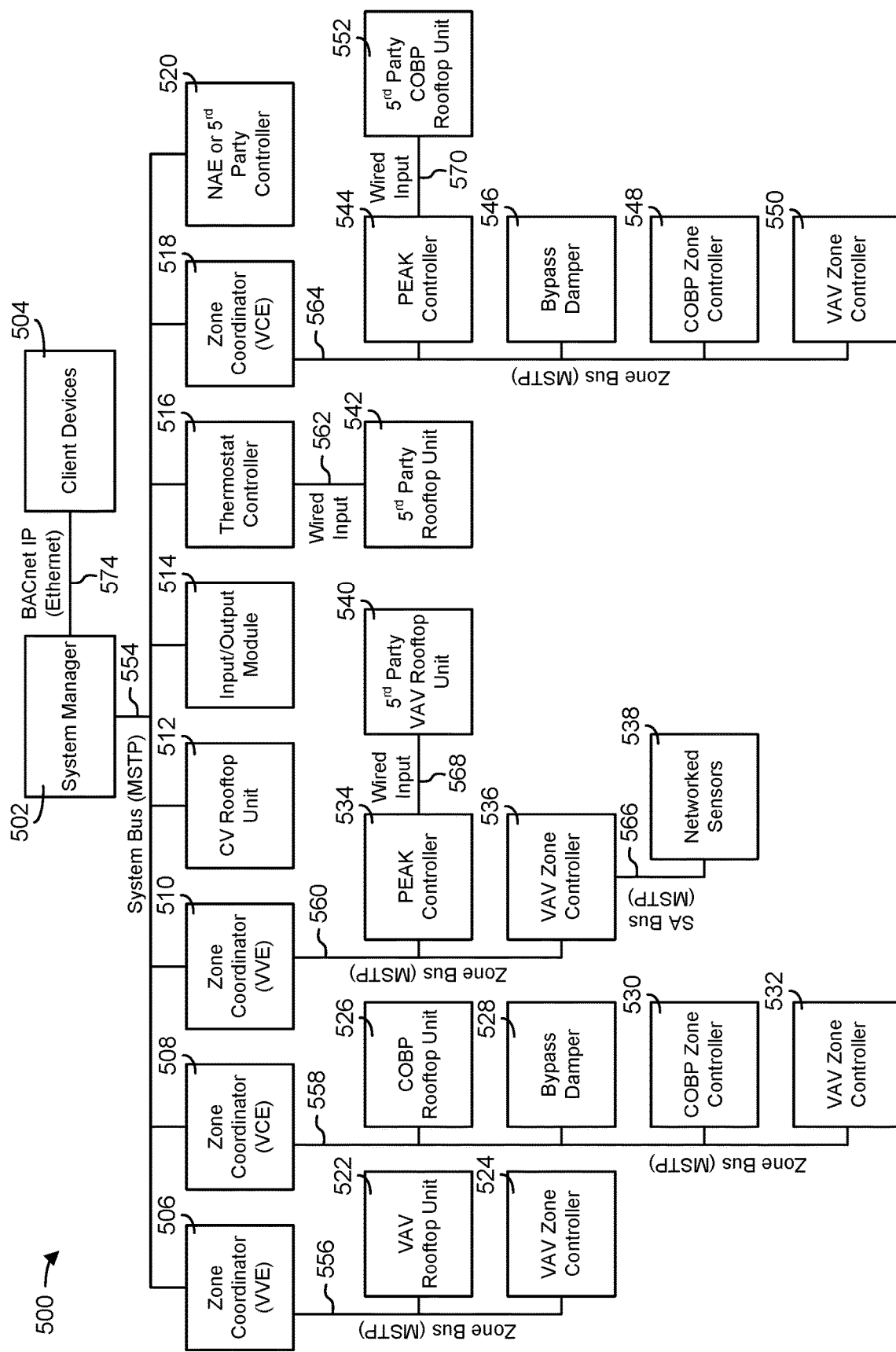
FIG. 5 is a block diagram of another building management system which can be used to monitor and control the building and HVAC system of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively.

Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

HVAC System with Automated Device Pairing and Dimensional Mismatch Handling

Figure 6A:
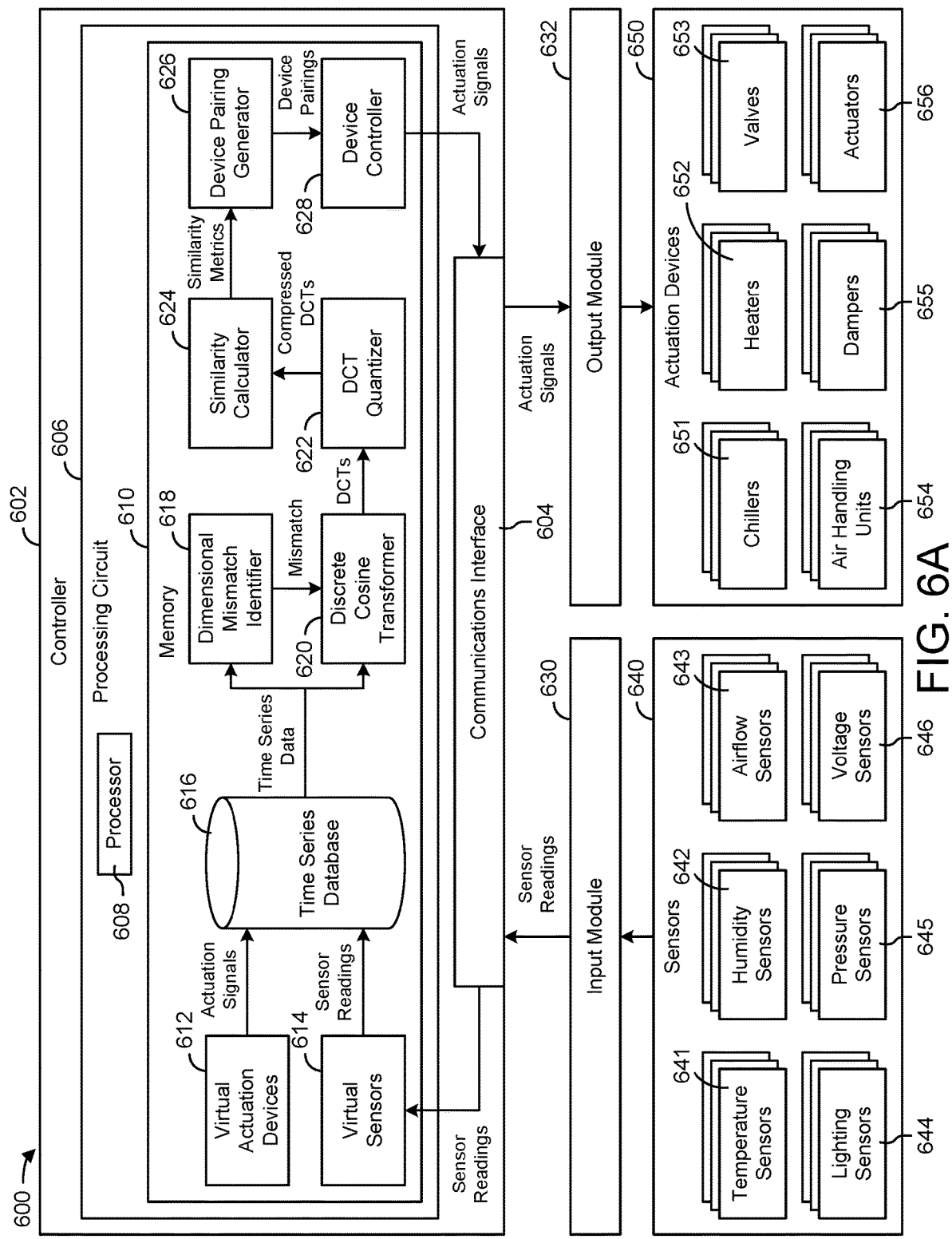
FIG. 6A is a block diagram of a HVAC system including sensors, actuation devices, and a controller, which can be implemented in the building of FIG. 1, according to an exemplary embodiment.

Referring now to FIG. 6A, a block diagram of a HVAC system 600 is shown, according to an exemplary embodiment. HVAC system 600 is shown to include a controller 602, an input module 630, an output module 632, several sensors 640, and several actuation devices 650. In brief overview, controller 602 receives sensor readings from sensors 640 via input module 630 and uses the sensor readings to generate actuation signals (e.g., control signals, setpoints, operating commands, etc.) for actuation devices 650. Controller 602 provides the actuation signals to actuation devices 650 via output module 632. Actuation devices 650 operate to affect an environmental condition in a building (e.g., temperature, humidity, airflow, etc.), which can be measured by sensors 640 and provided as a feedback to controller 602.

Controller 602 can be any type of controller in a HVAC system or BMS. In some embodiments, controller 602 is a zone controller configured to monitor and control a building zone. For example, controller 602 can be a zone temperature controller, a zone humidity controller, a zone lighting controller, a VAV zone controller (e.g., VAV zone controllers 524, 532, 536, 550), a COBP zone controller (e.g., COPB controller 530, 548), or any other type of controller for a building zone. In other embodiments, controller 602 is a system controller or subsystem controller. For example, controller 602 can be a BMS controller (e.g., BMS controller 366), a central plant controller, a subplant controller, a supervisory controller for a HVAC system or any other type of building subsystem (e.g., a controller for any of building subsystems 428). In some embodiments, controller 602 is a field controller or device controller configured to monitor and control the performance of a set of HVAC devices or other building equipment. For example, controller 602 can be an AHU controller (e.g., AHU controller 330), a thermostat controller (e.g., thermostat controller 516), a rooftop unit controller, a chiller controller, a damper controller, or any other type of controller in a HVAC system or BMS.

Sensors 640 can include any of a variety of physical sensors configured to measure a variable state or condition in a building. For example, sensors 640 are shown to include temperature sensors 641, humidity sensors 642, airflow sensors 643, lighting sensors 644, pressure sensors 645, and voltage sensors 646. Sensors 640 can be distributed throughout a building and configured to measure various environmental conditions at different locations in the building. For example, one of temperature sensors 641 can be located in a first zone of the building and configured to measure the temperature of the first zone, whereas another of temperature sensors 641 can be located in a second zone of the building and configured to measure the temperature of the second zone. Similarly, sensors 640 can be distributed throughout a HVAC system and configured to measure conditions at different locations in the HVAC system. For example, one of temperature sensors 641 can be a supply air temperature sensor configured to measure the temperature of the airflow provided to a building zone from an AHU, whereas another of temperature sensors 641 can be a return air temperature sensor configured to measure the temperature of the airflow returning from the building zone to the AHU.

Sensors 640 are shown providing sensor readings to controller 602 via input module 630. The sensor readings can include analog inputs, digital inputs, measurements, data samples, and/or other types of data generated by sensors 640. In some embodiments, sensors 640 provide analog inputs to input module 630 and input module 630 converts the analog inputs to digital data samples. Each data sample can include a data point and associated metadata. The data point can include a measured value attribute indicating the value of the measured variable and a time attribute indicating the time at which the measured value was observed. The metadata can include a unit of measure (e.g., degrees C., degrees F., kPa, volts, Watts, m/s, etc.), a sampling rate, a source description, a location, a purpose, or other attributes describing the associated data point. Controller 602 can receive the sensor readings from input module 630 and store the sensor readings as time series data in a time series database 616 (described in greater detail below). Controller 602 can use the sensor readings and/or time series data to generate appropriate actuation signals for actuation devices 650.

Actuation devices 650 can include any of a variety of physical devices configured to affect a variable state or condition in a building. For example, actuation devices 650 are shown to include chillers 651, heaters 652, valves 653, air handling units (AHUs) 654, dampers 655, and actuators 656. Although only a few types of actuation devices 650 are shown, it should be understood that actuation devices 650 can include any type of equipment or device configured to affect building conditions. For example, actuation devices 650 can power relays, switches, lights, pumps, fans, cooling towers, or other types of building equipment or central plant equipment. Actuation devices 650 can include some or all of the equipment in building 10, HVAC system 100, waterside system 200, airside system 300, BMS 400, and/or BMS 500, as described with reference to FIGS. 1-5. Actuation devices 650 can operate to affect various building conditions including temperature, humidity, airflow, lighting, air quality, power consumption, or any other variable state or condition in a building.

Actuation devices 650 are shown receiving actuation signals from controller 602 via output module 632. In some embodiments, the actuation signals are control signals for actuation devices 650 (e.g., operating setpoints, on/off commands, etc.). For example, the actuation signals can include commands to activate or deactivate individual chillers 651 or heaters 652 and/or commands to operate chillers 651 or heaters 652 at a variable capacity (e.g., operate at 20% capacity, 40% capacity, etc.). The actuation signals can include position setpoints for valves 653, dampers 655, or actuators 656. The position setpoints can include commands to move to a fully closed position, a 50% open position, a fully open position, or any intermediate position.

In some embodiments, the actuation signals are provided directly to actuation devices 650 from controller 602 and used to adjust a physical operation of actuation devices 650 (e.g., if controller 602 directly controls actuation devices 650). In other embodiments, the actuation signals are provided to an intermediate controller for actuation devices 650. For example, controller 602 can provide a setpoint to a local controller for one or more of actuation devices 650. The local controller can then generate control signals for actuation devices 650 to achieve the setpoint received from controller 602.

Controller 602 can use the sensor readings from sensors 640 as feedback to determine appropriate actuation signals for actuation devices 650. Controller 602 can be configured to use one or more feedback control algorithms (e.g., state-based algorithms, extremum seeking control (ESC) algorithms, proportional-integral (PI) control algorithms, proportional-integral-derivative (PID) control algorithms, model predictive control (MPC) algorithms, etc.) to control actuation devices 650 based on the sensor readings. For example, if the sensor reading from one of temperature sensors 641 indicates that the temperature of a particular building zone is below a temperature setpoint for the building zone, controller 602 can provide an actuation signal to one of heaters 652, dampers 655, or AHUs 654 to increase the amount of heating provided to the building zone.

In some embodiments, the feedback control actions performed by controller 602 require knowledge of the relationships between sensors 640 and actuation devices 650. For example, in order to drive the temperature measured by a particular temperature measured toward a setpoint, controller 602 may need to identify which of actuation devices 650 is configured to affect the measured temperature. In other words, controller 602 may need to identify causal relationships between various sensors 640 and actuation devices 650. If such relationships are not already known, controller 602 can perform an automated device pairing process to establish associations between various sensors 640 and actuation devices 650.

Some buildings have hundreds of sensors 640 and actuation devices 650. It can be cumbersome, error prone, and time consuming to manually identify the associations between sensors 640 and their corresponding actuation devices 650. Additionally, building evolve over time which can change existing relationships between sensors 640 and actuation devices 650. For example, remodeling a building can break existing relationships between paired sensors 640 and actuation devices 650 or create new relationships that did not previously exist. Advantageously, the automated device pairing process performed by controller 602 can automatically identify causal relationships between various sensors 640 and actuation devices 650 (e.g., heater A affects temperature sensor B, damper C affects flow sensor D, etc.). Once the causal relationships have been identified, controller 602 can store associations between related sensors 640 and actuation devices 650 and use the stored associations to perform control actions.

Still referring to FIG. 6A, controller 602 is shown to include a communications interface 604 and a processing circuit 606. Communications interface 604 can include wired or wireless communications interfaces (e.g., jacks, antennas, transmitters, receivers, transceivers, wire terminals, etc.) for conducting data communications with external systems or devices (e.g., input module 630, output module 632, sensors 640, actuation devices 650, etc.). Data communications via communications interface 604 can be direct (e.g., local wired or wireless communications) or via a communications network (e.g., a LAN, a WAN, the Internet, a cellular network, etc.). For example, communications interface 604 can include an Ethernet card and port for sending and receiving data via an Ethernet-based communications link or network, a Wi-Fi transceiver for communicating via a wireless communications network, and/or cellular or mobile phone communications transceivers for communicating via a cellular communications network.

Processing circuit 606 is shown to include a processor 608 and memory 610. Processing circuit 606 can be communicably connected to communications interface 604 such that processing circuit 606 and the various components thereof can send and receive data via communications interface 604. Processor 608 can be implemented as a general purpose processor, an application specific integrated circuit (ASIC), one or more field programmable gate arrays (FPGAs), a group of processing components, or other suitable electronic processing components.

Memory 610 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 610 can be or include volatile memory or non-volatile memory. Memory 610 can include database components, object code components, script components, or any other type of information structure for supporting the various activities and information structures described in the present application. In some embodiments, memory 610 is communicably connected to processor 608 via processing circuit 606 and includes computer code for executing (e.g., by processing circuit 606 and/or processor 608) one or more processes described herein.

Still referring to FIG. 6A, controller 602 is shown to include virtual sensors 614 and virtual actuation devices 612. Virtual sensors 614 can include logical representations of one or more physical sensors 640. For example, virtual sensors 614 can include data objects (e.g., BACnet objects, JSON objects, etc.), each of which corresponds to a particular physical sensor 640 and functions as a logical representation of the corresponding physical sensor 640 within the memory 610 of controller 602. Virtual sensors 614 can include various attributes which describe the corresponding physical sensors 640 and include the sensor readings from the corresponding physical sensors 640. An example of a virtual sensor 614 shown below:

```
{
    "unique identifier" : "ucis-2327-2127-sded-iesa",
    "signature" : "7b1c018bf975c88fbe9df6292bf370b1",
    "BACnet object" : {
        "object identifier" : "analog input #1101",
        "object name" : "507_SP2.RET_AIR",
        "description" : "return air temp",
        "device type" : "thermistor",
        "object type" : "analog input",
        "units" : "DEG_F",
        "present value" : "68"
        "update interval" : "15 min",
        "status flags" : [
            "in alarm",
            "fault",
            "overridden",
            "out of service"
        ],
        "event status" : "normal",
        "reliability" : "no fault detected",
        "out of service" : "false",
    }
}
```

Virtual sensors 614 can include a unique identifier attribute and a signature attribute. In some embodiments, the unique identifier attribute is a text string uniquely identifying a particular virtual sensor 614 (e.g., ucis-2327-2127-sded-iesa). The signature attribute can be generated by controller 602 as a function of the BACnet object attribute values. For example, controller 602 can generate the signature attribute using the following function:

Signature=MD5(CONCAT("analog input #1101", "507_SP2.RET_AIR","return air temp","thermistor","analog input","DEG_F","15 min","68")

where the CONCAT ( ) function is a string concatenation function of the attribute values and the MD5 ( ) function is a hashing function producing a hash value (e.g., a 128 bit hash value). When any of the attribute values change, the signature attribute will also change. Accordingly, the signature attribute enables capturing of source data changes, including changes in the present value of the sensor reading.

Virtual sensors 614 can include a BACnet object attribute with various sub-attributes describing the corresponding physical sensors 640. For example, virtual sensors 614 can include an object identifier attribute which identifies the type of input (e.g., analog input, digital input, enumerated value input, binary input, etc.), an object name attribute which names the corresponding physical sensor (e.g., 507_SP2.RET_AIR), a description attribute which provides a description of the measured value (e.g., return air temperature, supply air temperature, relative humidity, etc.), and a device type attribute which indicates the type of physical sensor 640 represented by the virtual sensor 614 (e.g., thermistor, thermocouple, limit switch, piezoelectric, etc.).

Virtual sensors 614 can include a present value attribute which indicates the present value of the sensor reading (e.g., 68), a units attribute which indicates the unit of measure of the present value attribute (e.g., degrees F., degrees C., kPa, volts, etc.), and an update interval attribute which indicates how often the present value attribute is updated (e.g., 15 minutes, 1 minute, 1 second, etc.). In some embodiments, virtual sensors 614 include status attributes (e.g., status flags, event status, reliability, etc.) which indicate the current status of the corresponding physical sensor 640. The attributes of virtual sensors 614 can be updated in real time (e.g., continuously or periodically as defined by the update interval) to reflect the current sensor readings and/or the status of the corresponding physical sensors 640. In some embodiments, virtual sensors 614 include software agents which monitor the sensor readings and other information (e.g., metadata) received from sensors 640 and update the corresponding attribute values accordingly.

Similarly, virtual actuation devices 612 can include logical representations of one or more physical actuation devices 650. For example, virtual actuation devices 612 can include data objects (e.g., BACnet objects, JSON objects, etc.), each of which corresponds to a particular physical actuation device 650 and functions as a logical representation of the corresponding physical actuation device 650 within the memory 610 of controller 602. Virtual actuation devices 612 can include various attributes which describe the corresponding physical actuation devices 650. In some embodiments, virtual actuation devices 612 include some or all of the same attributes of virtual sensors 614, as previously described. In some embodiments, virtual actuation devices 612 include a present value attribute which includes the most recent value of the actuation signal provided to the virtual actuation device.

Still referring to FIG. 6A, controller 602 is shown to include a time series database 616. Virtual sensors 614 are shown providing sensor readings to time series database 616, whereas virtual actuation devices 612 are shown providing actuation signals to time series database 616. The sensor readings provided by virtual sensors 614 can include a series of sensor readings collected by each of sensors 640 over time. Similarly, the actuation signals provided by virtual actuation devices 612 can include a series of values of the actuation signals provided to each of actuation devices 650 over time. Time series database 616 can store the sensor readings and actuation signals as time series data for each of sensors 640 and actuation devices 650. Each time series corresponds to one of sensors 640 or actuation devices 650 and includes a series of data values received from the corresponding sensor 640 or provided to the corresponding actuation device 650.

In some embodiments, each time series is a partially ordered tuple of a particular data point and associated metadata, as shown in the following equation:

Timeseries=<Data Point,Metadata>

Each data point may include a series of data values (e.g., sensor reading values or actuation signal values) and corresponding times at which those values were measured or provided. An example of a Data Point is shown in the following equation:

Data Point=<time,value> where each of time and value can include a vector of time series values. Metadata can include various attributes of the corresponding data point, as shown in the following equation:

Metadata=<unit,sampling rate,source description, location,purpose, . . . > where each item of Metadata represents one of the attributes (and corresponding attribute values) of the virtual sensor 614 or virtual actuation device 612 from which the time series values of the associated data point were received. Time series database 616 can store each time series for use by other components of controller 602.

In some embodiments, time series database 616 stores each time series of actuation signal values as an actuation signal time series $t(x)$ as shown in the following equation:

$$t(x)=\{t_1,t_2,t_3, \ldots ,t_{N-1},t_N\}$$

where each element $t_i$ of the actuation signal time series $t(x)$ is the value of the actuation signal at a particular time (i.e., a sample of the actuation signal) and N is the total number of elements in the actuation signal time series $t(x)$. Similarly, time series database 616 can store each time series of sensor reading values as a sensor response time series $r(x)$ as shown in the following equation:

$$r(x)=\{r_1,r_2,r_3, \ldots ,r_{M-1},r_M\}$$

where each element $r_i$ of the sensor response time series $r(x)$ is the value of the sensor response signal at a particular time (i.e., a sample of the sensor response signal) and M is the total number of elements in the sensor response time series $r(x)$.

Controller 602 can automatically identify causal relationships between various sensors 640 and actuation devices 650 based on the time series data associated therewith. For example, for each actuation signal time series $t(x)$, controller 602 can identify one or more of the sensor response time series $r(x)$ which closely match the actuation signal time series. In some embodiments, controller 602 uses a distance function to determine which of the sensor response time series $r(x)$ most closely match the actuation signal time series $t(x)$. As described in detail below, the distance function may compare corresponding values $t_i$ and $r_i$ of each time series to calculate a similarity metric or similarity score for pairs of actuation signal time series $t(x)$ and sensor response time series $r(x)$.

In some embodiments, the similarity metric calculation performed by controller 602 requires the actuation signal time series $t(x)$ and sensor response time series $r(x)$ to have the same number of samples (i.e., N=M) and/or sampling rate to allow the corresponding values $t_i$ and $r_i$ of each time series to be identified and compared. However, some time series can have different numbers of samples (i.e., N≠M), which can be collected at different sampling rates. This is referred to as a dimensional mismatch between time series. A dimensional mismatch between time series can complicate the similarity metric calculation since it can be difficult to determine the corresponding values $t_i$ and $r_i$ of each time series. However, controller 602 can automatically identify and compensate for dimensional mismatches between time series.

Still referring to FIG. 6A, controller 602 is shown to include a dimensional mismatch identifier 618. Dimensional mismatch identifier 618 is configured to identify dimensional mismatches between various actuation signal time series $t(x)$ and sensor response time series $r(x)$. As described above, a dimensional mismatch may occur when two time series have a different number of samples and/or sampling rates. In some embodiments, dimensional mismatch identifier 618 determines the size of each time series. For example, dimensional mismatch identifier 618 can determine the number of samples N in the actuation signal time series $t(x)$ and the number of samples M in the sensor response time series $r(x)$. Dimensional mismatch identifier 618 can detect a dimensional mismatch in response to a determination that the number of samples N in the actuation signal time series $t(x)$ is different from the number of samples M in the sensor response time series $r(x)$ (i.e., N≠M).

In some embodiments, dimensional mismatch identifier 618 determines the sampling rate of each time series. In some embodiments, the sampling rate of a time series may be stored as metadata associated with the time series in time series database 616. Dimensional mismatch identifier 618 can determine the sampling rate of a time series by reading the sampling rate from the metadata in time series database 616. In other embodiments, dimensional mismatch identifier 618 calculates the sampling rate for one or more time series based on the size of the time series and the range of time spanned by the time series.

Dimensional mismatch identifier 618 can identify a start time and an end time for the time series by reading the timestamps associated with the first and last data samples in the time series. Dimensional mismatch identifier 618 can then calculate the sampling rate by dividing the size of the time series by the difference between the end time and the start time, as shown in the following equation:

$$\text{sampling\_rate} = \frac{\text{size\_of\_timeseries}}{\text{end\_time} - \text{start\_time}}$$

where size_of_timeseries is the number of samples M or N in the time series, end_time is the timestamp associated with the last sample in the time series, start_time is the timestamp associated with the first sample in the time series, and sampling_rate is the sampling rate of the time series, expressed as the number of samples per unit time (e.g., 0.8 samples/hour). Dimensional mismatch identifier 618 can detect a dimensional mismatch in response to a determination that two time series have different sampling rates.

Dimensional mismatch identifier 618 can be configured to correct a dimensional mismatch between two time series. In some embodiments, dimensional mismatch identifier 618 corrects dimensional mismatch by increasing the number of samples of the time series with the fewer number of samples (e.g., by interpolating between samples). In other embodiments, dimensional mismatch identifier 618 corrects dimensional mismatch by reducing the number of samples of the time series with the greater number of samples (e.g., by discarding extra samples). In other embodiments, dimensional mismatch identifier 618 merely identifies a dimensional mismatch to other components of controller 602 which are configured to address the dimensional mismatch. For example, dimensional mismatch identifier 618 is shown reporting a dimensional mismatch to discrete cosine transformer 620.

Still referring to FIG. 6A, controller 602 is shown to include a discrete cosine transformer 620. Discrete cosine transformer 620 can be configured to perform a discrete cosine transform (DCT) for each actuation signal time series t(x) and sensor response time series r(x). A DCT expresses a finite sequence of data points in terms of a sum of cosine functions oscillating at different frequencies. In particular, a DCT is a Fourier-related transform similar to the discrete Fourier transform (DFT), but using only real numbers. There are eight standard DCT variants, commonly referred to as DCT-I, DCT-II, DCT-III, DCT-IV, DCT-V, DCT-VI, DCT-VII, and DCT-VIII. One of these variants (i.e., DCT-II) is discussed in detail below. However, it should be understood that discrete cosine transformer 620 can use any standard or non-standard DCT variant in other embodiments.

In some embodiments, discrete cosine transformer 620 performs a DCT for each actuation signal time series t(x) using the following equation:

$$T(k) = \sum_{i=0}^{N-1} t_i \cos\left[\frac{\pi}{N}\left(i + \frac{1}{2}\right)k\right]$$

$$k = 0, \ldots, N-1$$

where T(k) is the kth coefficient of the DCT of the actuation signal time series t(x), $t_i$ is the ith sample of the actuation signal time series t(x), and N is the number of samples of the actuation signal time series t(x). Discrete cosine transformer 620 can generate an array T of the DCT coefficients (e.g., T=[T(0), T(1), T(2), . . . , T(N−2), T(N−1)]) where the length of the array T is the same as the number of samples N of the actuation signal time series t(x).

Similarly, discrete cosine transformer 620 can perform a DCT for each sensor response time series r(x) using the following equation:

$$R(k) = \sum_{i=0}^{M-1} r_i \cos\left[\frac{\pi}{M}\left(i + \frac{1}{2}\right)k\right]$$

$$k = 0, \ldots, M-1$$

where R(k) is the kth coefficient of the DCT of the sensor response time series r(x), $r_i$ is the ith sample of the sensor response time series r(x), and M is the number of samples of the sensor response time series r(x). Discrete cosine transformer 620 can generate an array R of the DCT coefficients (e.g., R=[R(0), R(1), R(2), . . . , R(M−2), R(M−1)]) where the length of the array R is the same as the number of samples M of the sensor response time series r(x).

The following example illustrates the result of applying DCT to an input time series X(n). The input time series X(n) can be an actuation signal time series t(x) or a sensor response time series r(x) as previously described. The samples of the input time series X(n) are shown in the following array:

X(n)=[1.00,1.70,2.00,2.00,4.30,4.50,3.00,3.00,2.30, 2.20,2.20,2.30]

where the input time series X(n) includes twelve time series values X(1), . . . , X(12). Applying DCT to the input time series X(n) results in a set of DCT coefficients, shown in the following array:

Y(k)=[8.80,−0.57,−2.65,−1.15,0.81,0.52,−0.20,−0.93,− 0.63,0.32,0.50,−0.06]

where the array of DCT coefficients Y(k) includes twelve DCT coefficients Y(1), . . . , Y(12).

Still referring to FIG. 6A, controller 602 is shown to include a DCT quantizer 622. DCT quantizer 622 can be configured to apply a quantization process to the sets of DCT coefficients generated by discrete cosine transformer 620. As described above, the DCT process performed by discrete cosine transformer 620 converts an input data time series X(n) into a sum of cosine functions which oscillate at different frequencies. The cosine function with the lowest frequency is typically first in the summation, followed by cosine functions with successively higher frequencies. Accordingly, the DCT coefficient which occurs first in the array of DCT coefficients Y(k) represents the magnitude of the lowest frequency cosine function. Each of the following DCT coefficients represents the magnitude of a cosine function with a successively higher oscillation frequency.

DCT quantizer 622 can apply a quantization process to the sets of DCT coefficients by filling some of the higher frequency DCT coefficients with zeros. This has the effect of removing some of the higher frequency components (i.e., cosine functions) from the summation while retaining the lower frequency components. In some embodiments, DCT quantizer 622 performs the quantization process using a predetermined quantization level. The quantization level may define the number of the DCT coefficients which are retained (i.e., not filled with zeros). For example, a quantization level of six may retain the DCT coefficients applied to the six lowest frequency cosine functions (e.g., the first six DCT coefficients in the array) while the remaining DCT coefficients are filled with zeros.

The following example illustrates the result of a quantization process which can be performed by DCT quantizer 622. DCT quantizer 622 can modify the array of DCT coefficients Y(k) shown above to form the following quantized array QY(k):

$$QY(k) = [8.80, -0.57, -2.65, -1.15, 0.81, 0.52, 0.00, 0.00, 0.00, 0.00, 0.00, 0.00]$$

In this example, a quantization level of six is applied, meaning that only the first six DCT coefficients are retained from the original array of DCT coefficients Y(k). The remaining DCT coefficients are filled with zeros. True compression can be achieved by not storing the zeros. For example, DCT quantizer 622 can store the following compressed array C(k):

$$C(k) = [8.80, -0.57, -2.65, -1.15, 0.81, 0.52]$$

in which the coefficients filled with zeros are discarded to produce a compressed array with a length equal to the quantization level applied. In this example, the compressed array C(k) has a length of six resulting from the use of a quantization level of six. In various embodiments, DCT quantizer 622 can use a quantization level of six or any other quantization level to produce compressed arrays of various lengths.

In some embodiments, DCT quantizer 622 automatically determines the quantization level to apply based on the number of samples in each of the original actuation signal time series t(x) and sensor response time series r(x). As described above, the number of DCT coefficients produced by discrete cosine transformer 620 for a given input time series X(n) may be equal to the number of samples in the time series X(n) prior to performing DCT. For example, an input time series $X_1(n)$ with twelve samples may result in twelve DCT coefficients in the resultant DCT coefficient array $Y_1(k)$, whereas an input time series $X_2(n)$ with ten samples may result in ten DCT coefficients in the resultant DCT coefficient array $Y_2(k)$. In some embodiments, DCT quantizer 622 identifies the actuation signal time series t(x) or sensor response time series r(x) with the fewest samples and applies a quantization level equal to the number of samples in the identified time series.

In some embodiments, DCT quantizer 622 applies the same quantization level to the sets of DCT coefficients corresponding to each of the original actuation signal time series t(x) and sensor response time series r(x). Using the same quantization level for each of the original time series may result in the same number of compressed DCT coefficients being stored for each of the original actuation signal time series t(x) and sensor response time series r(x). In some embodiments, the number of stored DCT coefficients is equal to the number of samples in the original time series with the fewest samples. Advantageously, this allows for direct comparison of the DCT coefficients in the compressed arrays C(k) generated for each of the original time series without requiring decompression, interpolation, synchronization, or other processing steps after the compressed arrays C(k) are generated.

In some embodiments, DCT quantizer 622 generates a compressed time series Ta based on each compressed array of DCT coefficients. DCT quantizer 622 can store the compressed time series $T_\alpha$ using the following data structure:

$$T_\alpha = \langle \alpha, \delta, \rho, \kappa, \langle \psi \rangle, \langle \upsilon_1, \upsilon_2, \ldots \upsilon_p \rangle \rangle$$

where $\alpha$ is the time series ID of the source time series (e.g., the actuation signal time series t(x) or sensor response time series r(x)), $\delta$ is the dimension of the source time series (e.g., the number of samples in the source time series), $\rho$ is the quantization level applied by DCT quantizer 622, $\kappa$ is a pointer for metadata, $\langle \psi \rangle$ indicates the start time and end time of samples in the source time series, and $\langle \upsilon_1, \upsilon_2, \ldots \upsilon_p \rangle$ is the array of compressed DCT coefficients. An example of a compressed time series stored using this data structure is as follows:

$$T_{203} = \langle 203, 12, 6, \langle 2016{:}10{:}05{:}12{:}00{:}00, 2016{:}10{:}05{:}13{:}00{:}00 \rangle, \langle 8.80, -0.57, -2.65, -1.15, 0.81, 0.52 \rangle \rangle$$

where 203 is the time series ID of the source time series, 12 is size of the source time series (e.g., 12 samples in the source time series), 6 is the quantization level applied by DCT quantizer 622, 2016:10:05:12:00:00 is the start time of the source time series (e.g., the timestamp of the earliest sample in the source time series), 2016:10:05:13:00:00 is the end time of the source time series (e.g., the timestamp of the latest sample in the source time series), and the array $\langle 8.80, -0.57, -2.65, -1.15, 0.81, 0.52 \rangle$ includes the compressed DCT coefficients generated by DCT quantizer 622.

Still referring to FIG. 6A, controller 602 is shown to include a similarity calculator 624. Similarity calculator 624 can be configured to determine whether two time series are similar to each other based on the compressed DCT coefficients and/or compressed time series generated by DCT quantizer 622. In some embodiments, similarity calculator 624 determines whether any of the sensor response time series r(x) are similar to a given actuation signal time series t(x). Similarity calculator 624 can repeat this process for each actuation signal time series t(x) to determine whether any of the sensor response time series r(x) are similar to each actuation signal time series t(x).

In some embodiments, similarity calculator 624 determines whether two time series are similar to each other by calculating a similarity metric for the two time series. The similarity metric can be based on the compressed DCT coefficients generated by DCT quantizer 622 for the two time series. For example, the compressed DCT coefficients generated for a given actuation signal time series t(x) can be represented by an array T, whereas the compressed DCT coefficients generated for a given sensor response time series r(x) can be represented by an array R. The arrays T and R can be particular instances of the compressed array C(k) generated by DCT quantizer 622 for the actuation signal time series t(x) and the sensor response time series r(x), respectively. Each array T and R can include a predetermined number N of DCT coefficients, defined by the quantization level applied by DCT quantizer 622. Examples of arrays T and R are as follows:

$$T = \langle t_1, t_2, \ldots t_N \rangle$$

$$R = \langle r_1, r_2, \ldots, r_N \rangle$$

Similarity calculator 624 can calculate a similarity metric for the source time series t(x) and r(x) based on the corresponding arrays T and R of compressed DCT coefficients. In some embodiments, similarity calculator 624 calculates the similarity metric using the following equation:

$$d(T, R) = \sum_{i=1}^{i=N} \frac{\sqrt{(t_i - r_i)^2}}{\delta_i}$$

where $t_i$ is the ith DCT coefficient in the array T based on the actuation signal time series t(x), $r_i$ is the ith DCT coefficient in the array R based on the sensor response time series r(x), $\delta_i$ is the standard deviation of the ith DCT coefficients, and N is the number of DCT coefficients in each array T and R. Low values of the similarity metric d(T, R) indicate a greater similarity, whereas high values of the similarity metric d (T, R) indicate a lesser similarity. Similarity calculator 624 can calculate a similarity metric for each pairing of an actuation signal time series t(x) and a sensor response time series r(x).

Still referring to FIG. 6A, controller 602 is shown to include a device pairing generator 626. Device pairing generator 626 is shown receiving the similarity metrics from similarity calculator 624. Device pairing generator 626 can be configured to generate device pairings based on the similarity metrics. Each device pairing may include one of sensors 640 and one of actuation devices 650. A device pairing may indicate that the actuation device 650 in the device pairing is configured to affect the variable measured by the sensor 640 in the device pairing. For each potential device pairing (i.e., for each combination of a sensor 640 and an activation device 650), device pairing generator 626 can identify the corresponding arrays T and R of compressed DCT coefficients and the calculated similarity metric d(T, R) based on the arrays T and R. Device pairing generator 626 can use the similarity metric d(T, R) to determine whether to generate a device pairing between the given sensor 640 and the given actuation device 650.

In some embodiments, device pairing generator 626 generates device pairings by comparing the similarity metric d(T, R) to a threshold value. Device pairing generator 626 can be configured to generate a device pairing between a sensor 640 and an actuation device 650 if the similarity metric d(T, R) is less than the threshold value (e.g., d(T, R)<threshold). The threshold value can be a predefined value or a calculated value (e.g., a standard deviation of the DCT coefficients).

In some embodiments, the threshold value is a similarity metric between the actuation signal time series t(x) and a baseline (e.g., average) sensor signal time series a(x) over a predetermined time period. The baseline sensor signal time series a(x) can indicate the average sensor response from a particular sensor 640 before the actuation signal is applied to the actuation device 650 (e.g., baseline sensor readings), whereas the sensor response time series r(x) can indicate the sensor response from the same sensor 640 after the actuation signal is applied to the actuation device 650. If the actuation device 650 affects the sensor 640, the actuation signal time series t(x) is expected to be more similar to the sensor response time series r(x) than the baseline sensor signal time series a(x). Accordingly, the similarity metric d(T, R) between the actuation signal time series t(x) and the sensor response time series r(x) is expected to be lower (i.e., more similar) than the similarity metric d(T, A) between the actuation signal time series t(x) and the baseline sensor signal time series a(x).

In some embodiments, time series database 616 stores a baseline sensor signal time series a(x) for each of sensors 640 based on sensor readings from sensors 640 before the actuation signal is applied to actuation devices 650. Time series database 616 can also store a sensor response time series r(x) for each of sensors 640 based on sensor readings from sensors 640 while the actuation signal is applied to actuation devices 650 or after the actuation signal is applied to actuation devices 650. Discrete cosine transformer 620 and DCT quantizer 622 can generate DCT coefficients and compressed DCT coefficients for each baseline sensor signal time series a(x), sensor response time series r(x), and actuation signal time series t(x). Similarity calculator 624 can then calculate a similarity metric d(T, R) between each actuation signal time series t(x) and sensor response time series r(x) and a similarity metric d(T, A) between each actuation signal time series t(x) and baseline sensor signal time series a(x). Device pairing generator 626 can generate a device pairing between a sensor 640 and an actuation device 650 if the similarity metric d (T, R) for a given combination of a sensor 640 and an actuation device 650 is less than the similarity metric d(T,A) for the sensor 640 and the actuation device 650.

In some embodiments, device pairing generator 626 generates device pairings by comparing the similarity metrics d(T, R) for various combinations of sensors 640 and actuation devices 650. For each actuation device 650, device pairing generator 626 can identify the similarity metrics d(T, R) calculated for the actuation device 650 in combination with each of sensors 640. Each similarity metric d(T, R) indicates the similarity (i.e., the closeness) between the actuation signal time series t(x) associated with the actuation device 650 and the sensor response time series r(x) associated with one of sensors 640. For example, the similarity metric $d(T_1, R_1)$ may indicate the similarity between a first actuation device 650 (corresponding to array $T_1$) and a first sensor 640 (corresponding to array $R_1$), whereas the similarity metric $d(T_1, R_2)$ may indicate the similarity between the first actuation device 650 and a second sensor 640 (corresponding to array $R_2$). Device paring generator 626 can identify all of the similarity metrics associated with a given actuation device 650 (e.g., $d(T_1, R_1), \ldots, d(T_1, R_P)$), where P is the total number of sensors 640 and/or sensor response time series r(x)).

Device pairing generator 626 can determine which of the identified similarity metrics is the lowest for a given actuation device 650. The lowest similarity metric indicates the closest match between the actuation signal time series t(x) associated with the actuation device 650 and the sensor response time series r(x) associated with one of sensors 640. Device pairing generator 626 can generate a device pairing between the actuation device 650 and the sensor 640 having the lowest similarity metric d(T, R) with the actuation device 650. If the actuation device 650 has the same similarity metric with multiple sensors 640 (e.g., $d(T_1, R_1) = d(T_1, R_2)$), device pairing generator 626 can examine the time delay $\Delta w$ between the actuation signal time series t(x) associated with the actuation device 650 and sensor response time series r(x) associated with each of sensors 640. The time delay $\Delta w$ may indicate the delay between the time $w_1$ at which the actuation signal is applied to the actuation device 650 and the time $w_2$ at which the effects of the actuation signal are evident in the sensor response (e.g., $\Delta w = w_2 - w_1$). Device pairing generator 626 can determine which of the sensors 640 has the lowest time delay $\Delta w$ and can generate a device pairing between the actuation device 650 and the sensor 640 with the lowest time delay $\Delta w$.

Device pairing generator 626 can generate one or more device pairings for each of actuation devices 650. Each device pairing can identify one of actuation devices 650 and one of sensors 640. A device pairing between an actuation device 650 and a sensor 640 indicates that the actuation device 650 is capable of affecting the value measured by the sensor. Device pairing generator 626 can provide the device pairings to device controller 628. Device controller 628 can use the device pairings to generate the actuation signals for actuation devices 650. In some embodiments, device controller 628 uses the device pairings to automatically generate and store causal relationships between various sensors 640 and actuation devices 650.

In some embodiments, device controller 628 uses the device pairings to create kits of causally related devices. Each kit may be a logical grouping or set of devices in HVAC system 600 which includes one or more of sensors 640 and one or more of actuation devices 650. In some embodiments, each kit includes all of the sensors 640 and actuation devices 650 that are linked to each other by the device pairings generated by device pairing generator 626. Each device in a given kit may have a device pairing with at least one other device in the kit. For example, a temperature sensor for a building zone may have a device pairing with a chiller which is operable to affect the temperature of the building zone. The temperature sensor may also have device pairings with an air handling unit and an airflow damper which operate to provide airflow to the building zone. The kit generated by device controller 628 may include the temperature sensor and all of the actuation devices which operate to affect the temperature of the building zone (e.g., the chiller, the air handling unit, the airflow damper, etc.).

In some embodiments, device controller 628 uses the kits to detect and diagnose faults or performance issues in the building. For example, a temperature fault for a building zone (e.g., temperature out of range) can be detected by a temperature sensor located in the building zone. However, the temperature fault may originate from a fault in one or more of the actuation devices 650 which affect the temperature measured by the temperature sensor. Device controller 628 can use the kits of causally related devices to identify one or more actuation devices 650 (e.g., a chiller, a heater, an air handling unit, a damper, etc.) which operate to affect the variable in fault (e.g., the temperature measured by the temperature sensor). Device controller 628 can then test the actuation devices 650 in the kit to determine whether any of the actuation devices 650 are operating abnormally and diagnose the cause of the fault.

In some embodiments, device controller 628 uses the kits to generate recommendations for resolving the fault. For example, device controller 628 may recommend that all of the actuation devices 650 in a kit be tested or investigated in order to determine which of the actuation devices 650 is contributing to a detected fault associated with a sensor 640 in the kit. In some embodiments, the recommendation is based on a duration of the fault. For example, if the fault has been occurring for an amount of time which is less than a duration threshold, device controller 628 may recommend that one or more of the devices in the kit be investigated or tested. However, if the fault has been occurring for an amount of time which exceeds the duration threshold, device controller 628 may recommend that one or more of the devices in the kit be replaced, repaired, or changed in order to resolve the fault.

In some embodiments, device controller 628 provides actuation devices 650 with test signals as part of the device pairing process. The test signals may be predetermined signals or sequences of control operations which differ from the control signals provided to actuation devices 650 during normal operation. In some embodiments, the test signals are the actuation signals t(x) used by other components of controller 602 to generate the device pairings. Device controller 628 can provide the test signals to actuation devices 650 via communications interface 604 and to virtual actuation devices 612. Virtual actuation devices 612 can update their status in real time based on the test signals.

In some embodiments, device controller 628 uses the device pairings to create feedback control loops for HVAC system 600. Each feedback control loop can receive a feedback signal from one or more of sensors 640 and can provide a control signal to one or more of actuation devices 650. Device controller 628 can use the device pairings to define the sensors 640 and actuation devices 650 in each control loop. For example, device controller 628 can create a control loop which receives a feedback signal from the sensor 640 in a device pairing and provides a control signal to the actuation device 650 in the device pairing. Device controller 628 can map the sensor readings from the sensor 640 in the device pairing to the feedback signal in the control loop. Similarly, device controller 628 can map the actuation signals provided to the actuation device 650 in the device pairing to the control signal in the control loop.

Device controller 628 can use the feedback control loops to generate the actuation signals for actuation devices 650. Device controller 628 can use state-based algorithms, extremum seeking control (ESC) algorithms, proportional-integral (PI) control algorithms, proportional-integral-derivative (PID) control algorithms, model predictive control (MPC) algorithms, or any other type of control methodology to generate the actuation signals for actuation devices 650 based on the sensor readings. For example, if the sensor reading from one of temperature sensors 641 indicates that the temperature of a particular building zone is below a temperature setpoint for the building zone, device controller 628 can provide an actuation signal to one of heaters 652, dampers 655, or AHUs 654 to increase the amount of heating provided to the building zone. Advantageously, the relationships between actuation devices 650 and sensors 640 can be identified automatically based on the device pairings to allow device controller 628 to determine which of actuation devices 650 can be operated to affect a given sensor reading.

Figure 6B:
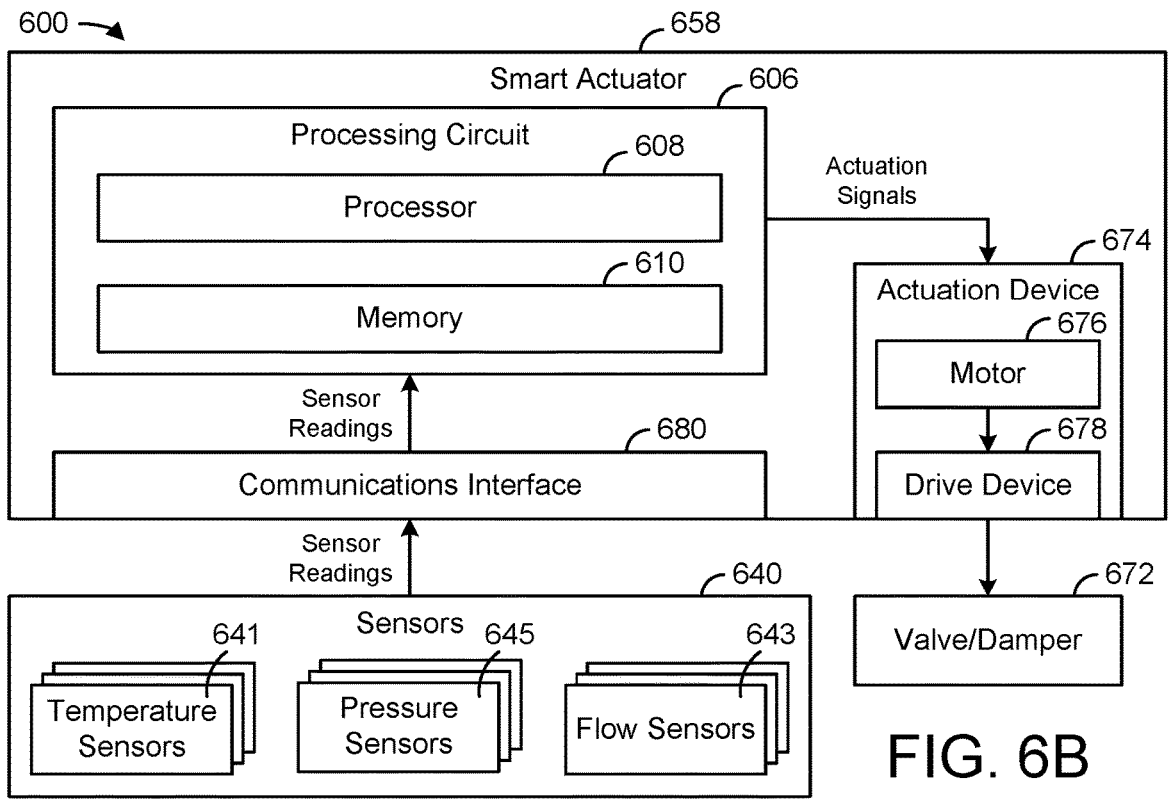
FIG. 6B is a block diagram illustrating a portion of the HVAC system of FIG. 6A in greater detail including a smart actuator which can be configured to perform automated device pairing, according to an exemplary embodiment.

Referring now to FIG. 6B, a block diagram illustrating a portion of HVAC system 600 in greater detail is shown, according to an exemplary embodiment. HVAC system 600 is shown to include a smart actuator 658, sensors 640, and a valve/damper 672. Smart actuator 658 may be one of actuation devices 650 or a separate actuator in HVAC system 600. Valve/damper 672 may be an airflow damper, a fluid control valve, an expansion valve, or any other type of flow control device in HVAC system 600. Smart actuator 658 can be configured to operate valve/damper 672 (e.g., by opening and closing valve/damper 672) based on sensor readings received from sensors 640. Advantageously, smart actuator 658 can automatically determine which of sensors 640 is affected by valve/damper 672 and can operate valve/damper 672 based on the sensor readings from the affected sensor or sensors 640.

Smart actuator 658 is shown to include an actuation device 674 having a motor 676 and a drive device 678. Drive device 678 may be mechanically coupled to valve/damper 672 and configured to open and close valve/damper 672 when operated by motor 676. Motor 676 may be mechanically coupled to drive device 678 and configured to operate drive device 678 based on actuation signals received from processing circuit 606. Unlike conventional actuators, smart actuator 658 can independently and automatically determine appropriate actuation signals for actuation device 674 without requiring input from an external controller.

Smart actuator 658 is shown to include a communications interface 680 and a processing circuit 606. Communications interface 680 may be the same or similar to communications interface 604, as described with reference to FIG. 6A. Communications interface 680 can include wired or wireless communications interfaces (e.g., jacks, antennas, transmitters, receivers, transceivers, wire terminals, etc.) for conducting data communications with external systems or devices (e.g., sensors 640, user devices, supervisory controllers, etc.). Data communications via communications interface 680 can be direct (e.g., local wired or wireless communications) or via a communications network (e.g., a LAN, a WAN, the Internet, a cellular network, etc.). For example, communications interface 680 can include an Ethernet card and port for sending and receiving data via an Ethernet-based communications link or network, a Wi-Fi transceiver for communicating via a wireless communications network, and/or cellular or mobile phone communications transceivers for communicating via a cellular communications network.

Processing circuit 606 may include some or all of the components of processing circuit 606 shown in FIG. 6A. For example, processing circuit 606 is shown to include a processor 608 and memory 608. Processing circuit 606 can be communicably connected to communications interface 680 such that processing circuit 606 and the various components thereof can send and receive data via communications interface 680. Processor 608 can be implemented as a general purpose processor, an application specific integrated circuit (ASIC), one or more field programmable gate arrays (FPGAs), a group of processing components, or other suitable electronic processing components.

Memory 610 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 610 can be or include volatile memory or non-volatile memory. Memory 610 can include database components, object code components, script components, or any other type of information structure for supporting the various activities and information structures described in the present application. In some embodiments, memory 610 is communicably connected to processor 608 via processing circuit 606 and includes computer code for executing (e.g., by processing circuit 606 and/or processor 608) one or more processes described herein.

Memory 610 may include some or all of the components of memory 610 shown in FIG. 6A. For example, memory 610 may include virtual actuation devices 612, virtual sensors 614, time series database 616, dimensional mismatch identifier 618, discrete cosine transformer 620, DCT quantizer 622, similarity calculator 624, device pairing generator 626, and device controller 628. When implemented in smart actuator 658, device pairing generator 626 can generate pairings between actuation device 674 and one or more of sensors 640 using the techniques described with reference to FIG. 6A. In other words, device pairing generator 626 can determine which of sensors 640 is/are affected by actuation device 674. Device controller 628 can use the device pairings and the sensor readings from the affected sensors 640 to generate actuation signals for actuation device 674.

Figure 6C:
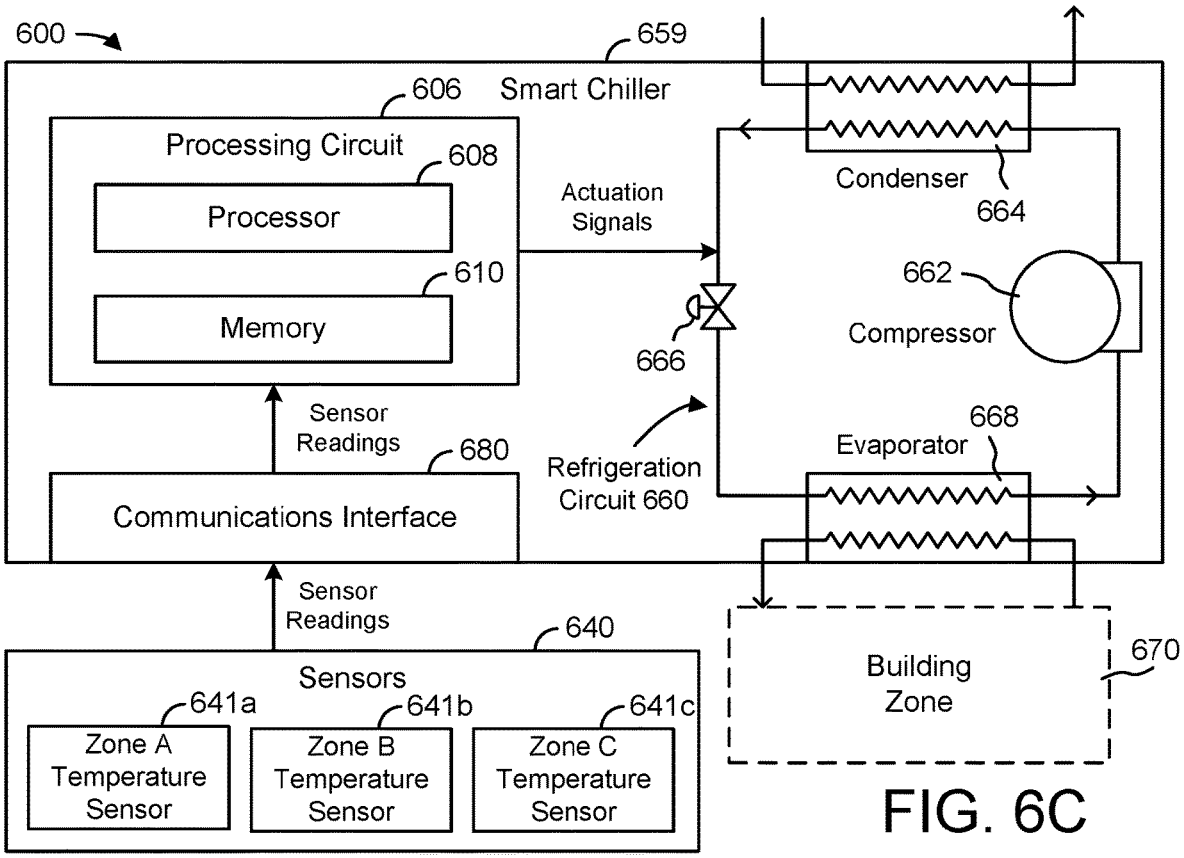
FIG. 6C is a block diagram illustrating a portion of the HVAC system of FIG. 6A in greater detail including a smart chiller which can be configured to perform automated device pairing, according to an exemplary embodiment.

Referring now to FIG. 6C, a block diagram illustrating another portion of HVAC system 600 in greater detail is shown, according to an exemplary embodiment. HVAC system 600 is shown to include a smart chiller 659, sensors 640, and a building zone 670. Smart chiller 659 may be one of actuation devices 650 or a separate chiller in HVAC system 600. Smart chiller 659 can be configured to provide cooling for building zone 670 based on sensor readings received from sensors 640. For example, smart chiller 659 is shown to include a refrigeration circuit 660 having a compressor 662, a condenser 664, an expansion device 666, and an evaporator 668. Compressor 662 can be configured to circulate a refrigerant between condenser 664 and evaporator 668 based on actuation signals received from processing circuit 606. Evaporator 668 can provide cooling for an airflow provided to building zone 670 either directly (e.g., by directly chilling the airflow) or via an intermediate coolant (e.g., by chilling a coolant which is used to chill the airflow). Unlike conventional chillers, smart chiller 659 can independently and automatically determine appropriate actuation signals for refrigeration circuit 660 without requiring input from an external controller.

Smart chiller 659 can automatically determine which of sensors 640 is/are affected by refrigeration circuit 660 and can operate refrigeration circuit 660 based on the sensor readings from the affected sensor(s) 640. For example, sensors 640 are shown to include a zone A temperature sensor 641a, a zone B temperature sensor 641b, and a zone C temperature sensor 641C. One or more of temperature sensors 641a-641c may be located in building zone 670 and configured to measure the temperature of building zone 670. However, the locations of temperature sensors 641a-641c may be unknown to smart chiller 659 when smart chiller 659 is first installed. Smart chiller 659 can use the device pairing techniques described with reference to FIG. 6A to determine which of temperature sensors 641a-641c is affected by refrigeration circuit 660.

Smart chiller 659 is shown to include a communications interface 680 and a processing circuit 606. Communications interface 680 may be the same or similar to communications interface 604, as described with reference to FIG. 6A. Communications interface 680 can include wired or wireless communications interfaces (e.g., jacks, antennas, transmitters, receivers, transceivers, wire terminals, etc.) for conducting data communications with external systems or devices (e.g., sensors 640, user devices, supervisory controllers, etc.). Data communications via communications interface 680 can be direct (e.g., local wired or wireless communications) or via a communications network (e.g., a LAN, a WAN, the Internet, a cellular network, etc.). For example, communications interface 680 can include an Ethernet card and port for sending and receiving data via an Ethernet-based communications link or network, a Wi-Fi transceiver for communicating via a wireless communications network, and/or cellular or mobile phone communications transceivers for communicating via a cellular communications network.

Processing circuit 606 may include some or all of the components of processing circuit 606 shown in FIG. 6A. For example, processing circuit 606 is shown to include a processor 608 and memory 608. Processing circuit 606 can be communicably connected to communications interface 680 such that processing circuit 606 and the various components thereof can send and receive data via communications interface 680. Processor 608 can be implemented as a general purpose processor, an application specific integrated circuit (ASIC), one or more field programmable gate arrays (FPGAs), a group of processing components, or other suitable electronic processing components.

Memory 610 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 610 can be or include volatile memory or non-volatile memory. Memory 610 can include database components, object code components, script components, or any other type of information structure for supporting the various activities and information structures described in the present application. In some embodiments, memory 610 is communicably connected to processor 608 via processing circuit 606 and includes computer code for executing (e.g., by processing circuit 606 and/or processor 608) one or more processes described herein.

Memory 610 may include some or all of the components of memory 610 shown in FIG. 6A. For example, memory 610 may include virtual actuation devices 612, virtual sensors 614, time series database 616, dimensional mismatch identifier 618, discrete cosine transformer 620, DCT quantizer 622, similarity calculator 624, device pairing generator 626, and device controller 628. When implemented in smart chiller 659, device pairing generator 626 can generate pairings between smart chiller 659 and one or more of sensors 640. In other words, device pairing generator 626 can determine which of sensors 640 is/are affected by smart chiller 659. Device controller 628 can use the device pairings and the sensor readings from the affected sensors 640 to generate actuation signals for compressor 662 and/or other components of refrigeration circuit 660.

Figure 6D:
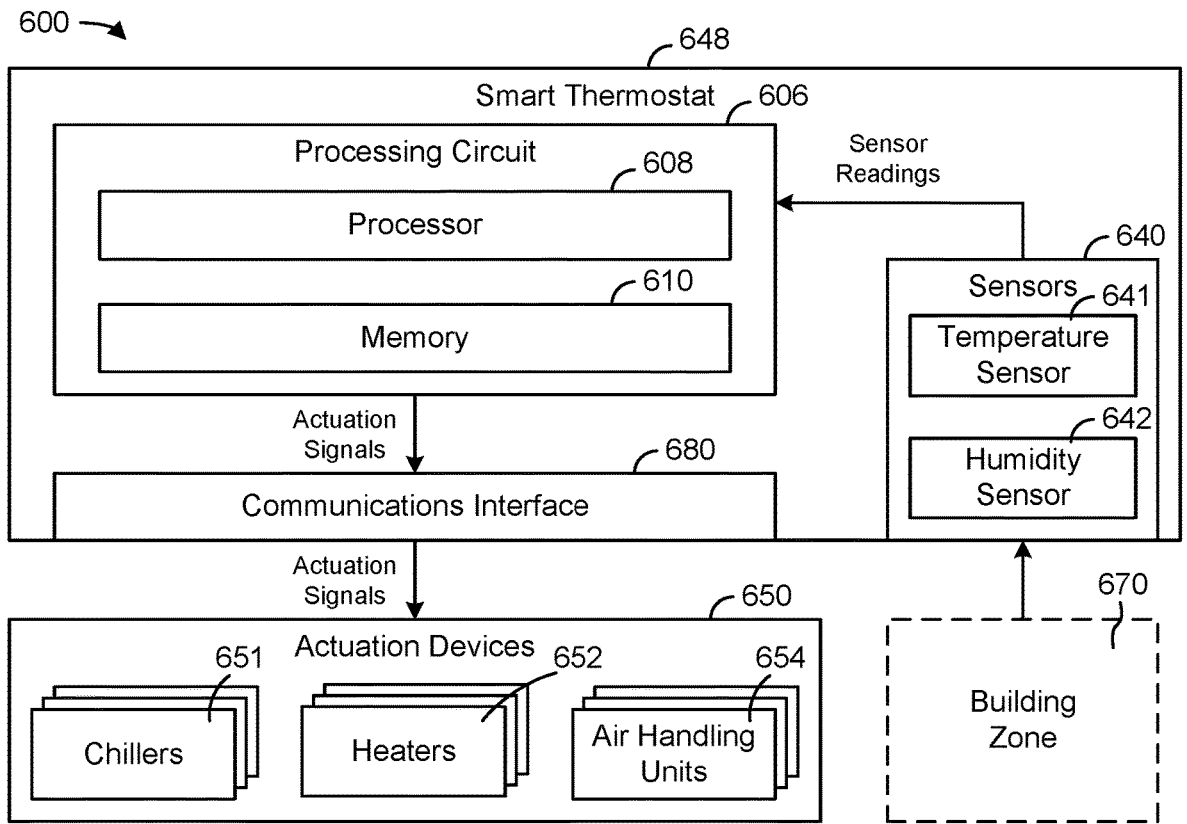
FIG. 6D is a block diagram illustrating a portion of the HVAC system of FIG. 6A in greater detail including a smart thermostat which can be configured to perform automated device pairing, according to an exemplary embodiment.

Referring now to FIG. 6D, a block diagram illustrating another portion of HVAC system 600 in greater detail is shown, according to an exemplary embodiment. HVAC system 600 is shown to include a smart thermostat 648, actuation devices 650, and a building zone 670. Smart thermostat 648 is shown to include sensors 640. Sensors 640 can include a temperature sensor 641, humidity sensor 642, or any other type of sensor 640, as described with reference to FIG. 6A. Sensors 640 can be configured to measure various environmental conditions or variables within building zone 670. For example, temperature sensor 641 can measure the temperature of building zone 670, whereas humidity sensor 642 can measure the humidity of building zone 670. Smart thermostat 648 can independently and automatically determine appropriate actuation signals for actuation devices 650 without requiring input from an external controller.

Smart thermostat 648 can automatically determine which of actuation devices 650 affect the environmental conditions of building zone 670 and can operate actuation devices 650 to control the environmental conditions measured by sensors 640. For example, actuation devices 650 are shown to include several chillers 651, several heaters 652, and several air handling units 654. One or more of actuation devices 650 may operate to affect conditions within building zone 670. However, smart thermostat 648 may be unaware of such causal relationships when smart thermostat 648 is initially installed. Smart thermostat 648 can use the device pairing techniques described with reference to FIG. 6A to determine which of actuation devices 650 can be operated to control conditions within building zone 670.

Smart thermostat 648 is shown to include a communications interface 680 and a processing circuit 606. Communications interface 680 may be the same or similar to communications interface 604, as described with reference to FIG. 6A. Communications interface 680 can include wired or wireless communications interfaces (e.g., jacks, antennas, transmitters, receivers, transceivers, wire terminals, etc.) for conducting data communications with external systems or devices (e.g., actuation devices 650, user devices, supervisory controllers, etc.). Data communications via communications interface 680 can be direct (e.g., local wired or wireless communications) or via a communications network (e.g., a LAN, a WAN, the Internet, a cellular network, etc.). For example, communications interface 680 can include an Ethernet card and port for sending and receiving data via an Ethernet-based communications link or network, a Wi-Fi transceiver for communicating via a wireless communications network, and/or cellular or mobile phone communications transceivers for communicating via a cellular communications network.

Processing circuit 606 may include some or all of the components of processing circuit 606 shown in FIG. 6A. For example, processing circuit 606 is shown to include a processor 608 and memory 608. Processing circuit 606 can be communicably connected to communications interface 680 such that processing circuit 606 and the various components thereof can send and receive data via communications interface 680. Processor 608 can be implemented as a general purpose processor, an application specific integrated circuit (ASIC), one or more field programmable gate arrays (FPGAs), a group of processing components, or other suitable electronic processing components.

Memory 610 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 610 can be or include volatile memory or non-volatile memory. Memory 610 can include database components, object code components, script components, or any other type of information structure for supporting the various activities and information structures described in the present application. In some embodiments, memory 610 is communicably connected to processor 608 via processing circuit 606 and includes computer code for executing (e.g., by processing circuit 606 and/or processor 608) one or more processes described herein.

Memory 610 may include some or all of the components of memory 610 shown in FIG. 6A. For example, memory 610 may include virtual actuation devices 612, virtual sensors 614, time series database 616, dimensional mismatch identifier 618, discrete cosine transformer 620, DCT quantizer 622, similarity calculator 624, device pairing generator 626, and device controller 628. When implemented in smart thermostat 648, device pairing generator 626 can generate pairings between sensors 640 and one or more of actuation devices 650. In other words, device pairing generator 626 can determine which of actuation devices 650 affect the variables or conditions measured by sensors 640. Device controller 628 can use the device pairings and the sensor readings from sensors 640 to generate actuation signals for actuation devices 650.

Example Graphs

Figure 7:
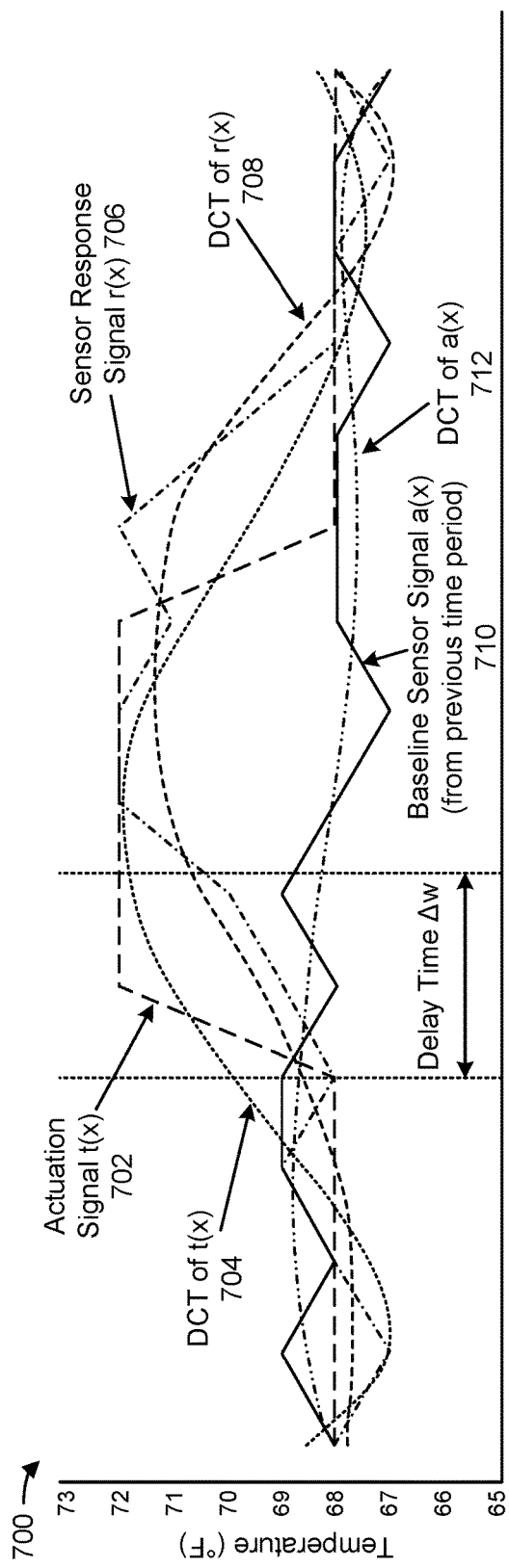
FIG. 7 is a graph illustrating different types of signals and time series evaluated by the controller of FIG. 6A, according to an exemplary embodiment.

Referring now to FIG. 7 a graph 700 illustrating the different types of signals evaluated by controller 602 is shown, according to an exemplary embodiment. In graph 700, line 702 represents an actuation signal $t(x)$, line 706 represents a sensor response signal $r(x)$, and line 710 represents a baseline sensor signal $a(x)$. The actuation signal $t(x)$ can be provided to one or more of actuation devices 650, as previously described. In the example shown in FIG. 7, the actuation signal $t(x)$ is a setpoint signal (e.g., a temperature setpoint) which can be provided as an input to actuation devices 650 (e.g., controllable HVAC equipment) which operate to affect the temperature of a building zone. In some embodiments, the actuation signal t(x) is a predetermined test signal which differs from the normal actuation signals provided to actuation devices 650. For example, the actuation signal t(x) is shown as a step increase from 68° F. to 72° F., which is held for a predetermined time period, followed by a step decrease from 72° F. back to 68° F. The actuation signal t(x) causes actuation devices 650 to increase an amount of heating provided to the building zone, which causes the temperature of the building zone to increase.

The sensor response signal r(x) can be received from one or more of sensors 640, as previously described. In the example shown in FIG. 7, the sensor response signal r(x) is a measured temperature signal received from a temperature sensor located in the building zone controlled by actuation devices 650. The temperature of the building zone begins to increase shortly after the actuation signal t(x) is increased, which results in an increase in the sensor response signal r(x). Similarly, the temperature of the building zone begins to decrease shortly after the actuation signal t(x) is decreased, which results in a decrease in the sensor response signal r(x). The time delay between the actuation signal t(x) and the sensor response signal r(x) is shown as delay time Δw.

The baseline sensor signal a(x) can be received from the same sensor 640 which provides the sensor response signal r(x). However, the baseline sensor signal a(x) indicates the sensor readings from the sensor 640 from a time period before the actuation signal t(x) is provided to actuation devices 650. The signals shown in graph 700 are characteristic of a sensor 640 and an actuation device 650 which have a causal relationship with each other. For example, the sensor response signal r(x) closely matches the actuation signal t(x), whereas the baseline sensor signal a(x) is significantly different from both the actuation signal t(x) and the sensor response signal r(x). In other words, the sensor response signal r(x) is correlated with the actuation signal t(x), which indicates a causal relationship between the corresponding actuation device 650 and sensor 640.

Still referring to FIG. 7, graph 700 is shown to include a line 704 representing the discrete cosine transform (DCT) of the actuation signal t(x), a line 708 representing the DCT of the sensor response signal r(x), and a line 712 representing the DCT of the baseline sensor signal a(x). Discrete cosine transformer 620 can be configured to generate DCTs of the various time series signals received or generated by controller 602, as previously described. In graph 700, the DCTs represented by lines 704, 708, and 712 are continuous functions (i.e., summations of cosine functions) which results in a smooth curves for each of lines 704, 708, and 712. Advantageously, the DCT functions reduce any noise present in the signals t(x), r(x), and a(x), and can be evaluated at any point. In some embodiments, controller 602 compares the DCTs of the actuation signal t(x), sensor response signal r(x), and baseline sensor signal a(x) rather than the original signals to determine whether a causal relationship exists between a particular sensor 640 and a particular actuation device 650.

Figure 8:
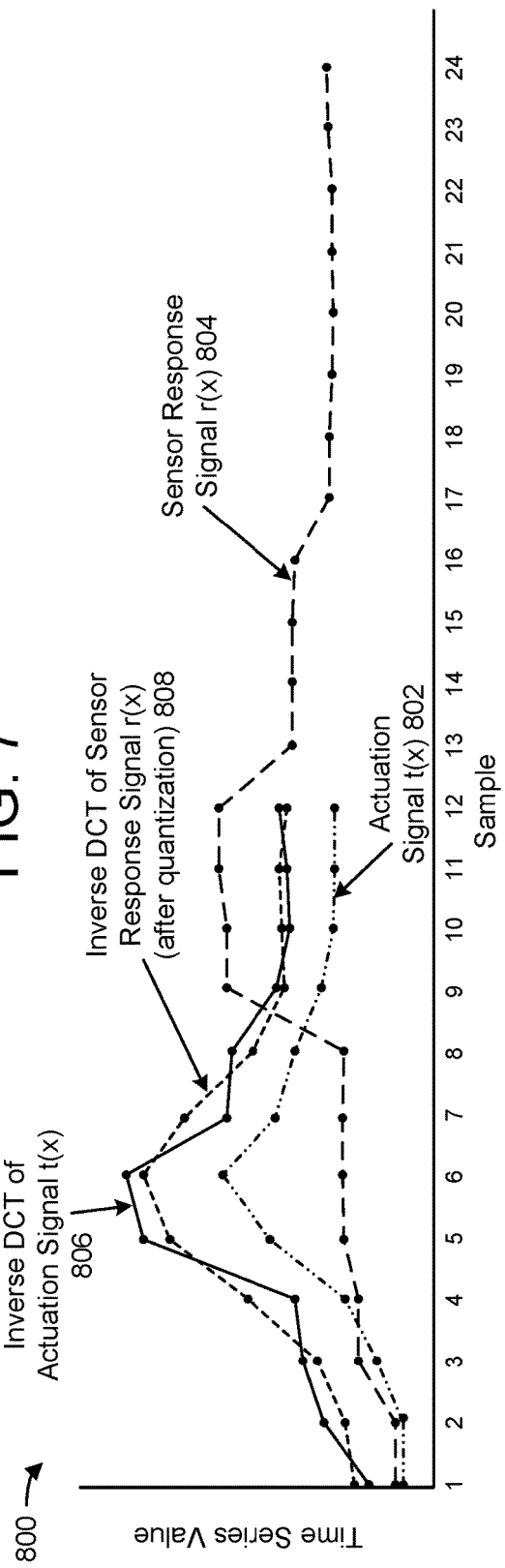
FIG. 8 is a graph illustrating dimensional mismatch handling performed by the controller of FIG. 6A, according to an exemplary embodiment.

Referring now to FIG. 8 a graph 800 illustrating the dimensional mismatch handling performed by controller 602 is shown, according to an exemplary embodiment. In graph 800, line 802 represents samples of actuation signal time series t(x) provided to one or more of actuation devices 650, whereas line 804 represents samples of a sensor response time series r(x) received from one or more of sensors 640. The actuation signal time series t(x) and the sensor response time series r(x) cover the same time period. However, sampling rate used to generate the samples of the sensor response time series r(x) is twice the sampling rate used to generate the samples of the actuation time series t(x), which results in twice as many samples of the sensor response time series r(x) being collected during the same time period. In other words, the sensor response time series r(x) includes twice as many samples (e.g., 24 samples) as the actuation signal time series t(x) (e.g., 12 samples).

In order to compare the actuation signal time series t(x) and the sensor response time series r(x), controller 602 can generate DCTs of each time series. As described with reference to FIG. 6A, discrete cosine transformer 620 can generate DCT coefficients for the actuation signal time series t(x) using the following equation:

$$T(k) = \sum_{i=0}^{N-1} t_i \cos\left[\frac{\pi}{N}\left(i + \frac{1}{2}\right)k\right]$$
$$k = 0, \ldots, N-1$$

where T(k) is the kth coefficient of the DCT of the actuation signal time series t(x), $t_i$ is the ith sample of the actuation signal time series t(x), and N is the number of samples of the actuation signal time series t(x). Discrete cosine transformer 620 can generate an array T of the DCT coefficients (e.g., T=[T(0), T(1), T(2), . . . , T(N−2), T(N−1)]) where the length of the array T is the same as the number of samples N of the actuation signal time series t(x) (e.g., 12 samples).

Similarly, discrete cosine transformer 620 can generate DCT coefficients for the sensor response time series r(x) using the following equation:

$$R(k) = \sum_{i=0}^{M-1} r_i \cos\left[\frac{\pi}{M}\left(i + \frac{1}{2}\right)k\right]$$
$$k = 0, \ldots, M-1$$

where R(k) is the kth coefficient of the DCT of the sensor response time series r(x), $r_i$ is the ith sample of the sensor response time series r(x), and M is the number of samples of the sensor response time series r(x). Discrete cosine transformer 620 can generate an array R of the DCT coefficients (e.g., R=[R(0), R(1), R(2), . . . , R(M−2), R(M−1)]) where the length of the array R is the same as the number of samples M of the sensor response time series r(x) (e.g., 24 samples).

To make the arrays T and R the same dimension, DCT quantizer 622 can perform a quantization process. In some embodiments, DCT quantizer 622 performs the quantization process using a predetermined quantization level. The quantization level may define the number of the DCT coefficients in each array T and R which are retained (i.e., not filled with zeros). For example, a quantization level of twelve may retain the first twelve DCT coefficients in each array T and R while the remaining DCT coefficients are filled with zeros. In the example shown in FIG. 8, DCT quantizer 622 applies a quantization level of twelve to each array T and R of DCT coefficients. This quantization level has no effect on the array T since the array T only contains 12 DCT coefficients. However, applying a quantization level of twelve to the array R has the effect of filling the final twelve DCT coefficients with zeros such that only the first twelve DCT coefficients in array R are retained.

Still referring to FIG. 8, graph 800 is shown to include a line 806 representing the inverse DCT of the actuation signal time series t(x) and a line 808 representing the inverse DCT of the sensor response time series r(x). Lines 806-808 illustrate the similarity between the quantized DCT functions based on the actuation signal time series t(x) and the sensor response time series r(x). As discussed with reference to FIG. 6A, similarity calculator 624 can evaluate the similarity between two or more DCT functions without reconstructing the inverse DCT (e.g., by calculating a distance between the DCT coefficients). However, the inverse DCTs are shown in graph 800 to illustrate how controller 602 can reduce the dimension of the sensor response time series r(x) to match the dimension of the actuation signal time series t(x) (or vice versa) by performing a discrete cosine transform and applying a quantization process.

Flow Diagrams

Figures 9, 10:
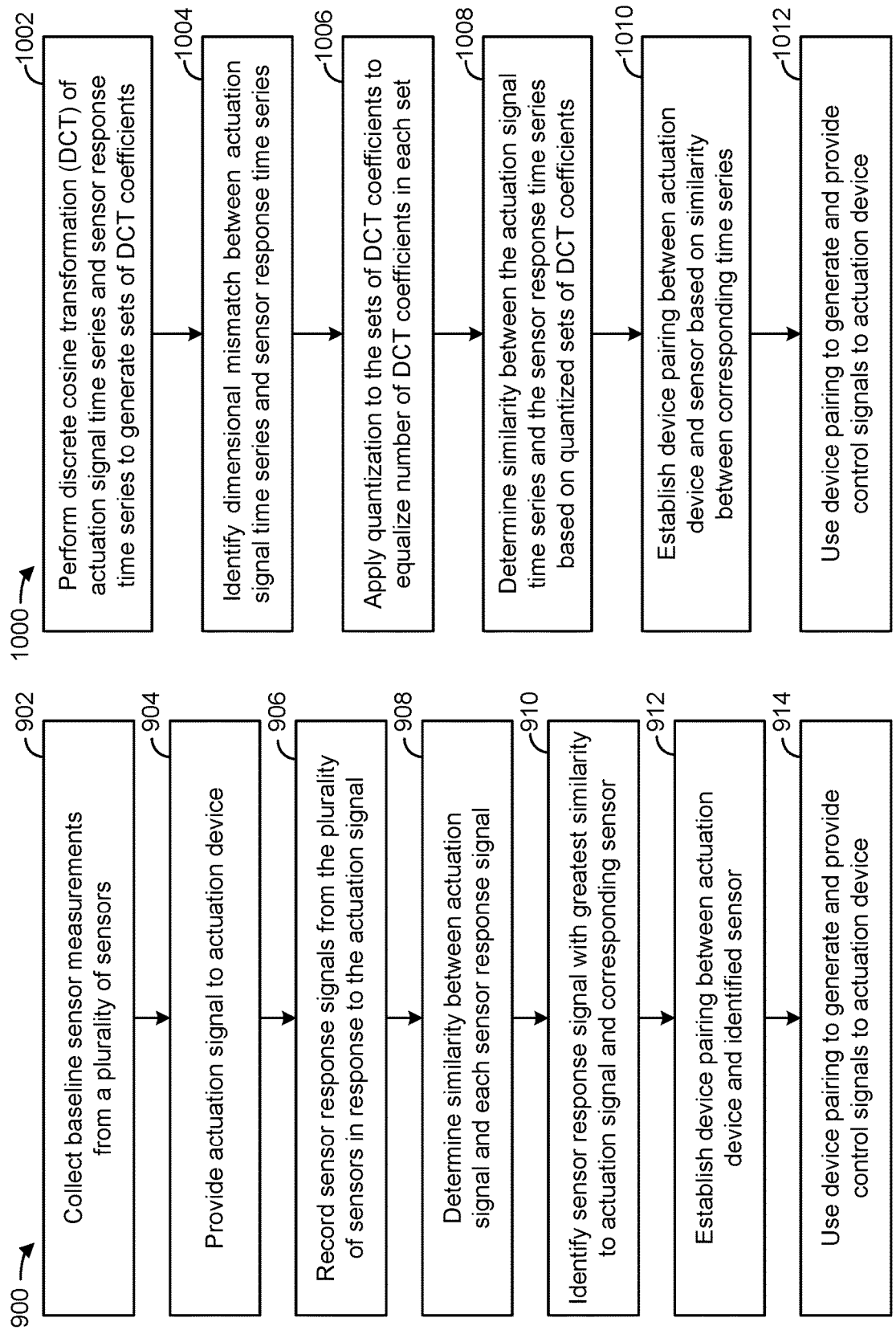
FIG. 9 is a flowchart of a process for establishing device pairings between sensors and actuation devices, which can be performed by the controller of FIG. 6A, according to an exemplary embodiment.
FIG. 10 is a flowchart of a process for handling dimensional mismatches between actuation signal time series and sensor response time series, which can be performed by the controller of FIG. 6A, according to an exemplary embodiment.

Referring now to FIG. 9, a flowchart of a process 900 for establishing device pairings between sensors and actuation devices is shown, according to an exemplary embodiment. In some embodiments, process 900 is performed by one or more components of controller 602, as described with reference to FIG. 6A. Process 900 can be used in a building and/or a building HVAC system to automatically establish device pairings between various sensors and causally-related actuation devices. The device pairings can then be used to automatically generate control loops for use in controlling the actuation devices.

Process 900 is shown to include collecting baseline sensor measurements from a plurality of sensors (step 902). The sensors can include some or all of sensors 640, as described with reference to FIG. 6A. For example, the sensors can include temperature sensors, humidity sensors, airflow sensors, lighting sensors, pressure sensors, voltage sensors, or any other type of sensor in a building and/or a building HVAC system. The sensors can be distributed throughout a building and configured to measure various environmental conditions at different locations in the building. For example, one temperature sensor can be located in a first zone of the building and configured to measure the temperature of the first zone, whereas another temperature sensor can be located in a second zone of the building and configured to measure the temperature of the second zone. Similarly, the sensors can be distributed throughout a HVAC system and configured to measure conditions at different locations in the HVAC system. For example, one of temperature sensor can be a supply air temperature sensor configured to measure the temperature of the airflow provided to a building zone from an AHU, whereas another temperature sensor can be a return air temperature sensor configured to measure the temperature of the airflow returning from the building zone to the AHU.

The baseline sensor measurements may be received from the plurality of sensors during a baseline time period before an actuation signal or test signal is provided to actuation devices 650. In some embodiments, the baseline temperature measurements are used to generate a baseline sensor signal time series a(x). The baseline sensor signal time series a(x) may indicate the average sensor readings from the plurality of sensors before the actuation signal or test signal is provided to the actuation devices 650.

In some embodiments, step 902 includes storing the baseline sensor signal time series a(x) in a time series database (e.g., time series database 616). The time series database can store the baseline sensor measurements from each of the plurality of sensors as separate baseline sensor signal time series a(x) as shown in the following equation:

$$a(x)=\{a_1,a_2,a_3,\ldots,a_{P-1},t_P\}$$

where each element $a_i$ of the baseline sensor signal time series a(x) is the value of a baseline sensor signal at a particular time (i.e., a sample of the baseline sensor signal) and P is the total number of elements in the baseline sensor signal time series a(x).

Still referring to FIG. 9, process 900 is shown to include providing an actuation signal to an actuation device (step 904). The actuation device can include any of actuation devices 650, as described with reference to FIG. 6A. For example, the actuation device can include a chiller, heater, valve, air handling unit (AHU), damper, actuator, and/or any other physical device configured to affect a variable state or condition in a building or building HVAC system. The actuation device can include any of the equipment in building 10, HVAC system 100, waterside system 200, airside system 300, BMS 400, and/or BMS 500, as described with reference to FIGS. 1-5. The actuation device can operate to affect various building conditions including temperature, humidity, airflow, lighting, air quality, power consumption, or any other variable state or condition in a building. In some embodiments, the actuation device receives the actuation signal from a controller (e.g., controller 602) via an output module.

In some embodiments, the actuation signal is a control signal for the actuation devices (e.g., operating setpoints, on/off commands, etc.). For example, the actuation signal can include commands to activate or deactivate the actuation device and/or commands to operate the actuation device a variable capacity (e.g., operate at 20% capacity, 40% capacity, etc.). If the actuation device is a device with a variable position (e.g., a valve, a damper, an actuator, etc.) the actuation signal can include position setpoints for the actuation device. The position setpoints can include commands to move to a fully closed position, a 50% open position, a fully open position, or any intermediate position. In some embodiments, the actuation signal is a predetermined test signal which differs from the normal actuation signals provided to the actuation device.

In some embodiments, the actuation signal is provided directly to the actuation device from the controller and used to adjust a physical operation of the actuation device (e.g., if the controller directly controls the actuation device). In other embodiments, the actuation signal is provided to an intermediate controller for the actuation devices. For example, a supervisory controller can provide a setpoint to a local controller for the actuation device. The local controller can then generate control signals for the actuation devices to achieve the setpoint received from the supervisory controller.

In some embodiments, step 904 includes using the actuation signal to generate an actuation signal time series t(x). The actuation signal time series t(x) can be stored in the time series database. The time series database can store each time series of actuation signal values as an actuation signal time series t(x) as shown in the following equation:

$$t(x)=\{t_1,t_2,t_3,\ldots,t_{N-1},t_N\}$$

where each element $t_i$ of the actuation signal time series t(x) is the value of the actuation signal at a particular time (i.e., a sample of the actuation signal) and N is the total number of elements in the actuation signal time series t(x).

Still referring to FIG. 9, process 900 is shown to include recording sensor response signals from the plurality of sensors in response to the actuation signal (step 906). The sensor response signals indicate the effect of the actuation device on the variables measured by the plurality of sensors. If a causal relationship exists between the actuation device and a particular sensor (i.e., the actuation device can affect the value measured by the sensor), the sensor response signal may change in response to providing the actuation signal to the actuation device. However, if no causal relationship exists between the actuation device and the sensor (i.e., the actuation device is not capable of affecting the value measured by the sensor), the sensor response signal may not change in response to providing the actuation signal to the actuation device.

In some embodiments, step 906 includes generating time series of sensor response values. Each time series of sensor response values can be stored in the time series database as a sensor response time series r(x) as shown in the following equation:

$$r(x) = \{r_1, r_2, r_3, \ldots, r_{M-1}, r_M\}$$

where each element $r_i$ of the sensor response time series r(x) is the value of the sensor response signal at a particular time (i.e., a sample of the sensor response signal) and M is the total number of elements in the sensor response time series r(x).

Process 900 is shown to include determining a similarity between the actuation signal and each sensor response signal (step 908). In some embodiments, step 908 includes calculating a similarity metric or similarity score indicating a similarity (e.g., a distance) between the actuation signal time series t(x) and each of the sensor response time series r(x). The following equation can be used to calculate the similarity metric between the actuation signal time series t(x) and a given sensor response time series r(x):

$$d(t(x), r(x)) = \sum_{i=1}^{i=N} \frac{\sqrt{(t_i - r_i)^2}}{\delta_i}$$

where $t_i$ is the ith sample in the actuation signal time series t(x), $r_i$ is the ith sample in the sensor response time series r(x), $\delta_i$ is the standard deviation of the ith samples, and N is the number of samples in each time series. Low values of the similarity metric d(t(x), r(x)) indicate a greater similarity (i.e., a lower distance between time series), whereas high values of the similarity metric d(t(x), r(x)) indicate a lesser similarity (i.e., a greater distance between time series). Step 908 can include calculating a similarity metric for each pairing of the actuation signal time series t(x) with one of the sensor response time series r(x).

The previous equation for calculating the similarity metric can be used if both the actuation signal time series t(x) and the sensor response time series r(x) have the same number of samples. However, if the actuation signal time series t(x) and the sensor response time series r(x) have different numbers of samples, additional processing may be required. For example, step 908 may include performing a discrete cosine transformation (DCT) of the actuation signal time series t(x) and each sensor response time series r(x) to generate sets of DCT coefficients for each time series. The sets of DCT coefficients can then be quantized, as described with reference to FIG. 6A, to produce arrays of compressed DCT coefficients for each time series. The similarity metrics can then be calculated based on the compressed DCT coefficients generated for each time series.

The compressed DCT coefficients generated for the actuation signal time series t(x) can be represented by an array T, and the compressed DCT coefficients generated for a given sensor response time series r(x) can be represented by an array R. The arrays T and R can be particular instances of the compressed array C(k) generated by DCT quantizer 622 for the actuation signal time series t(x) and the sensor response time series r(x), respectively. Each array T and R can include a predetermined number N of DCT coefficients, defined by the quantization level applied by DCT quantizer 622. Examples of arrays T and R are as follows:

$$T = \langle t_1, t_2, \ldots, t_N \rangle$$

$$R = \langle r_1, r_2, \ldots, r_N \rangle$$

Step 908 can include generating an array T of DCT coefficients for the actuation signal time series t(x) and an array R of DCT coefficients for each of the sensor response time series r(x).

In some embodiments, step 908 includes calculating a similarity metric for the source time series t(x) and r(x) based on the corresponding arrays T and R of compressed DCT coefficients. Step 908 can include calculating the similarity metric using the following equation:

$$d(T, R) = \sum_{i=1}^{i=N} \frac{\sqrt{(t_i - r_i)^2}}{\delta_i}$$

where $t_i$ is the ith DCT coefficient in the array T based on the actuation signal time series t(x), $r_i$ is the ith DCT coefficient in the array R based on the sensor response time series r(x), $\delta_i$ is the standard deviation of the ith DCT coefficients, and N is the number of DCT coefficients in each array T and R. Low values of the similarity metric d(T, R) indicate a greater similarity, whereas high values of the similarity metric d(T, R) indicate a lesser similarity. Step 908 can include calculating a similarity metric for each pairing of the array T based on the actuation signal time series t(x) with one of the arrays R based on one of the sensor response time series r(x).

Still referring to FIG. 9, process 900 is shown to include identifying the sensor response signal with the greatest similarity to the actuation signal and the corresponding sensor (step 910). Step 910 can include comparing the similarity metrics d(T, R) calculated for the actuation device in combination with each of the plurality of sensors. Each similarity metric d (T, R) indicates the similarity (i.e., the closeness) between the actuation signal time series t(x) associated with the actuation device and the sensor response time series r(x) associated with one of the sensors. For example, the similarity metric d($T_1$, $R_1$) may indicate the similarity between the actuation device and a first sensor of the plurality of sensors (corresponding to array $R_1$), whereas the similarity metric d($T_1$, $R_2$) may indicate the similarity between the actuation device and a second sensor of the plurality of sensors (corresponding to array $R_2$).

Step 910 can include identifying all of the similarity metrics associated with the actuation device (e.g., d($T_1$, $R_1$), . . . , d($T_1$, $R_P$), where P is the total number of sensors and/or sensor response time series r(x)). In some embodiments, step 910 includes determining which of the identified similarity metrics is the lowest. The lowest similarity metric may indicate the closest match between the actuation signal time series t(x) associated with the actuation device and the sensor response time series r(x) associated with one of the sensors. In other embodiments, step 910 can include determining which of the identified similarity metrics is the highest. For example, other techniques for calculating the similarity metric may produce larger similarity metrics when two time series match more closely. Regardless of how the similarity metric is calculated, step 910 can include identifying the similarity metric which indicates the closest match between the actuation signal time series t(x) and the corresponding sensor response time series r(x).

If the actuation device has the same similarity metric with multiple sensors (e.g., $d(T_1, R_1)=d(T_1, R_2)$), step 910 can include examining the time delay Δw between the actuation signal time series t(x) associated with the actuation device and sensor response time series r(x) associated with each of the sensors. The time delay Δw may indicate the delay between the time $w_1$ at which the actuation signal is applied to the actuation device and the time $w_2$ at which the effects of the actuation signal are evident in each sensor response (e.g., $\Delta w = w_2 - w_1$). Step 910 can include identifying the sensor and/or sensor response time series r(x) with the lowest time delay Δw relative to the actuation signal time series t(x).

Still referring to FIG. 9, process 900 is shown to include establishing a device pairing between the actuation device and the identified sensor (step 912). The device pairing can include the actuation device and the sensor identified in step 910. The device pairing between the actuation device and the sensor indicates that the actuation device is capable of affecting the value measured by the sensor. In some embodiments step 910 includes using the device pairing to automatically generate and store causal relationships between the actuation device and the identified sensor.

Process 900 is shown to include using the device pairing to generate and provide control signals to the actuation device (step 914). Step 914 can include using the device pairing to create a feedback control loop for HVAC system 600. The feedback control loop can receive a feedback signal from the identified sensor and can provide a control signal to the actuation device. Step 914 can include using the device pairing to define the sensor and actuation device in the control loop. For example, step 914 can include creating a control loop which receives a feedback signal from the sensor in the device pairing and provides a control signal to the actuation device in the device pairing. Step 914 can include mapping the sensor readings from the sensor in the device pairing to the feedback signal in the control loop. Similarly, step 914 can include mapping the actuation signals provided to the actuation device in the device pairing to the control signal in the control loop.

Step 914 can include using the feedback control loop to generate actuation signals for the actuation device. Step 914 can include using state-based algorithms, extremum seeking control (ESC) algorithms, proportional-integral (PI) control algorithms, proportional-integral-derivative (PID) control algorithms, model predictive control (MPC) algorithms, or any other type of control methodology to generate the actuation signals for the actuation device based on the sensor readings. For example, if the sensor reading from the sensor indicates that the temperature of a particular building zone is below a temperature setpoint for the building zone, step 914 can include providing an actuation signal to the actuation device to increase the amount of heating provided to the building zone. Advantageously, process 900 can be performed to automatically establish relationships between various actuation devices and sensors based on the device pairings to allow controller 602 to determine which of the actuation devices can be operated to affect a given sensor reading.

Referring now to FIG. 10, a flowchart of a process 1000 for handling dimensional mismatches between actuation signal time series and sensor response time series is shown, according to an exemplary embodiment. In some embodiments, process 1000 is performed by one or more components of controller 602, as described with reference to FIG. 6A. Process 1000 can be used in a building and/or a building HVAC system to automatically establish device pairings between various sensors and actuation devices when the time series have different sampling rates and/or different numbers of samples. The device pairings can then be used to automatically generate control loops for use in controlling the actuation devices.

Process 1000 is shown to include performing a discrete cosine transformation (DCT) of actuation signal time series t(x) and sensor response time series r(x) to generate sets of DCT coefficients (step 1002). In some embodiments, step 1002 is performed by discrete cosine transformer 620, as described with reference to FIG. 6A. Step 1002 can include performing a DCT for each actuation signal time series t(x) and sensor response time series r(x). A DCT expresses a finite sequence of data points in terms of a sum of cosine functions oscillating at different frequencies. In particular, a DCT is a Fourier-related transform similar to the discrete Fourier transform (DFT), but using only real numbers. There are eight standard DCT variants, commonly referred to as DCT-I, DCT-II, DCT-III, DCT-IV, DCT-V, DCT-VI, DCT-VII, and DCT-VIII. One of these variants (i.e., DCT-II) is discussed in detail below. However, it should be understood that step 1002 can use any standard or non-standard DCT variant in other embodiments.

In some embodiments, step 1002 includes performing a DCT for each actuation signal time series t(x) using the following equation:

$$T(k) = \sum_{i=0}^{N-1} t_i \cos\left[\frac{\pi}{N}\left(i + \frac{1}{2}\right)k\right]$$

$$k = 0, \ldots, N-1$$

where T(k) is the kth coefficient of the DCT of the actuation signal time series t(x), $t_i$ is the ith sample of the actuation signal time series t(x), and N is the number of samples of the actuation signal time series t(x). Step 1002 can include generating an array T of the DCT coefficients (e.g., T=[T(0), T(1), T(2), . . . , T(N-2), T(N-1)]) where the length of the array T is the same as the number of samples N of the actuation signal time series t(x).

Similarly, step 1002 can include performing a DCT for each sensor response time series r(x) using the following equation:

$$R(k) = \sum_{i=0}^{M-1} r_i \cos\left[\frac{\pi}{M}\left(i + \frac{1}{2}\right)k\right]$$

$$k = 0, \ldots, M-1$$

where R(k) is the kth coefficient of the DCT of the sensor response time series r(x), $r_i$ is the ith sample of the sensor response time series r(x), and M is the number of samples of the sensor response time series r(x). Step 1002 can include generating an array R of the DCT coefficients (e.g., R=[R(0), R(1), R(2), ..., R(M−2), R(M−1)]) where the length of the array R is the same as the number of samples M of the sensor response time series r(x).

The following example illustrates the result of applying DCT to an input time series X(n). The input time series X(n) can be an actuation signal time series t(x) or a sensor response time series r(x) as previously described. The samples of the input time series X(n) are shown in the following array:

X(n)=[1.00,1.70,2.00,2.00,4.30,4.50,3.00,3.00,2.30,
2.20,2.20,2.30]

where the input time series X(n) includes twelve time series values X(1), ... ,X(12). Applying DCT to the input time series X(n) results in a set of DCT coefficients, shown in the following array:

Y(k)=[8.80,−0.57,−2.65,−1.15,0.81,0.52,−0.20,−0.93,−
0.63,0.32,0.50,−0.06]

where the array of DCT coefficients Y(k) includes twelve DCT coefficients Y(1), ... , Y(12).

Still referring to FIG. 10, process 1000 is shown to include identifying a dimensional mismatch between the actuation signal time series t(x) and the sensor response time series r(x) (step 1004). In some embodiment, step 1004 is performed by dimensional mismatch identifier 618, as described with reference to FIG. 6A. A dimensional mismatch may occur when two time series have a different number of samples and/or sampling rates. In some embodiments, step 1004 includes determining the size of each time series. For example, step 1004 can include determining the number of samples N in the actuation signal time series t(x) and the number of samples M in the sensor response time series r(x). The number of samples N and M can be determined by counting the number of samples in the original time series t(x) and r(x) or the number of elements in each of the arrays of DCT coefficients T and R. Step 1004 can include identifying a dimensional mismatch in response to a determination that the number of samples N in the actuation signal time series t(x) or the array T is different from the number of samples M in the sensor response time series r(x) or the array R (i.e., N≠M).

In some embodiments, step 1004 includes determining the sampling rate of each time series. In some embodiments, the sampling rate of a time series may be stored as metadata associated with the time series in time series database 616. Step 1004 can include determining the sampling rate of a time series by reading the sampling rate from the metadata in time series database 616. In other embodiments, step 1004 includes calculating the sampling rate for one or more time series based on the size of the time series and the range of time spanned by the time series.

Step 1004 can include identifying a start time and an end time for the time series by reading the timestamps associated with the first and last data samples in the time series. Step 1004 can include calculating the sampling rate by dividing the size of the time series by the difference between the end time and the start time, as shown in the following equation:

$$\text{sampling\_rate} = \frac{\text{size\_of\_timeseries}}{\text{end\_time} - \text{start\_time}}$$

where size_of_timeseries is the number of samples M or N in the time series, end_time is the timestamp associated with the last sample in the time series, start_time is the timestamp associated with the first sample in the time series, and sampling_rate is the sampling rate of the time series, expressed as the number of samples per unit time (e.g., 0.8 samples/hour). Step 1004 can include identifying a dimensional mismatch in response to a determination that two time series have different sampling rates.

In some embodiments, step 1004 includes correcting a dimensional mismatch by increasing the number of samples of the time series with the fewer number of samples (e.g., by interpolating between samples). In other embodiments, step 1004 includes correcting dimensional mismatch by reducing the number of samples of the time series with the greater number of samples (e.g., by discarding extra samples). In other embodiments, step 1004 merely identifies a dimensional mismatch which is corrected by subsequent steps of process 1000.

Still referring to FIG. 10, process 1000 is shown to include applying a quantization to the sets of DCT coefficients generated in step 1002 to equalize the number of DCT coefficients in each set (step 1006). In some embodiments, step 1006 is performed by DCT quantizer 622, as described with reference to FIG. 6A. Step 1006 can be performed in response to a determination in step 1004 that a dimensional mismatch exists between the actuation signal time series t(x) and the sensor response time series r(x).

As described above, the DCT process performed in step 1002 converts an input data time series X(n) into a sum of cosine functions which oscillate at different frequencies. The cosine function with the lowest frequency is typically first in the summation, followed by cosine functions with successively higher frequencies. Accordingly, the DCT coefficient which occurs first in the array of DCT coefficients Y(k) represents the magnitude of the lowest frequency cosine function. Each of the following DCT coefficients represents the magnitude of a cosine function with a successively higher oscillation frequency.

Step 1006 can include applying a quantization process to the sets of DCT coefficients by filling some of the higher frequency DCT coefficients with zeros. This has the effect of removing some of the higher frequency components (i.e., cosine functions) from the summation while retaining the lower frequency components. In some embodiments, step 1006 includes performing the quantization process using a predetermined quantization level. The quantization level may define the number of the DCT coefficients which are retained (i.e., not filled with zeros). For example, a quantization level of six may retain the DCT coefficients applied to the six lowest frequency cosine functions (e.g., the first six DCT coefficients in the array) while the remaining DCT coefficients are filled with zeros.

The following example illustrates the result of a quantization process which can be performed in step 1006. Step 1006 can include modifying the array of DCT coefficients Y(k) shown above to form the following quantized array QY(k):

QY(k)=[8.80,−0.57,−2.65,−1.15,0.81,0.52,0.00,0.00,
0.00,0.00,0.00,0.00]

In this example, a quantization level of six is applied, meaning that only the first six DCT coefficients are retained from the original array of DCT coefficients Y(k). The remaining DCT coefficients are filled with zeros. True compression can be achieved by not storing the zeros. For example, step 1006 can include storing the following compressed array C(k):

C(k)=[8.80,−0.57,−2.65,−1.15,0.81,0.52]

in which the coefficients filled with zeros are discarded to produce a compressed array with a length equal to the quantization level applied. In this example, the compressed array C(k) has a length of six resulting from the use of a quantization level of six. In various embodiments, step 1006 can use a quantization level of six or any other quantization level to produce compressed arrays of various lengths.

In some embodiments, step 1006 includes automatically determining the quantization level to apply based on the number of samples in each of the original actuation signal time series t(x) and sensor response time series r(x). As described above, the number of DCT coefficients produced in step 1002 for a given input time series X(n) may be equal to the number of samples in the time series X(n) prior to performing DCT. For example, an input time series $X_1(n)$ with twelve samples may result in twelve DCT coefficients in the resultant DCT coefficient array $Y_1(k)$, whereas an input time series $X_2(n)$ with ten samples may result in ten DCT coefficients in the resultant DCT coefficient array $Y_2$ (k). In some embodiments, step 1006 includes identifying the actuation signal time series t(x) or sensor response time series r(x) with the fewest samples and applies a quantization level equal to the number of samples in the identified time series.

In some embodiments, step 1006 includes applying the same quantization level to the sets of DCT coefficients corresponding to each of the original actuation signal time series t(x) and sensor response time series r(x). Using the same quantization level for each of the original time series may result in the same number of compressed DCT coefficients being stored for each of the original actuation signal time series t(x) and sensor response time series r(x). In some embodiments, the number of stored DCT coefficients is equal to the number of samples in the original time series with the fewest samples. Advantageously, this allows for direct comparison of the DCT coefficients in the compressed arrays C(k) generated for each of the original time series without requiring decompression, interpolation, synchronization, or other processing steps after the compressed arrays C(k) are generated.

In some embodiments, step 1006 includes generating a compressed time series $T_\alpha$ based on each compressed array of DCT coefficients. Step 1006 can include storing the compressed time series $T_\alpha$ using the following data structure:

$$T_\alpha = \langle \alpha, \delta, \rho, \kappa, \langle \psi \rangle, \langle \upsilon_1, \upsilon_2, \ldots \upsilon_p \rangle \rangle$$

where α is the time series ID of the source time series (e.g., the actuation signal time series t(x) or sensor response time series r(x)), δ is the dimension of the source time series (e.g., the number of samples in the source time series), ρ is the quantization level applied by in step 1006, κ is a pointer for metadata, $\langle \psi \rangle$ indicates the start time and end time of samples in the source time series, and $\langle \upsilon_1, \upsilon_2, \ldots \upsilon_p \rangle$ is the array of compressed DCT coefficients. An example of a compressed time series stored using this data structure is as follows:

$$T_{203} = \langle 203, 12, 6, \langle 2016:10:05:12:00:00, 2016:10:05: \\ 13:00:00 \rangle, \langle 8.80, -0.57, -2.65, -1.15, 0.81, 0.52 \rangle \rangle$$

where 203 is the time series ID of the source time series, 12 is size of the source time series (e.g., 12 samples in the source time series), 6 is the quantization level applied by in step 1006, 2016:10:05:12:00:00 is the start time of the source time series (e.g., the timestamp of the earliest sample in the source time series), 2016:10:05:13:00:00 is the end time of the source time series (e.g., the timestamp of the latest sample in the source time series), and the array ⟨8.80, −0.57, −2.65, −1.15, 0.81, 0.52⟩ includes the compressed DCT coefficients generated in step 1006.

Still referring to FIG. 10, process 1000 is shown to include determining a similarity between the actuation signal time series t(x) and the sensor response time series r(x) based on the quantized sets of DCT coefficients (step 1008). The quantized DCT coefficients generated for the actuation signal time series t(x) can be represented by an array T, and the compressed DCT coefficients generated for a given sensor response time series r(x) can be represented by an array R. The arrays T and R can be particular instances of the compressed array C(k) generated in step 1006 for the actuation signal time series t(x) and the sensor response time series r(x), respectively. Each array T and R can include a predetermined number N of DCT coefficients, defined by the quantization level applied in step 1006. Examples of arrays T and R are as follows:

$$T = \langle t_1, t_2, \ldots t_N \rangle$$

$$R = \langle r_1, r_2, \ldots, r_N \rangle$$

In some embodiments, step 1008 includes calculating a similarity metric for the source time series t(x) and r(x) based on the corresponding arrays T and R of compressed DCT coefficients. Step 1008 can include calculating the similarity metric using the following equation:

$$d(T, R) = \sum_{i=1}^{i=N} \frac{\sqrt{(t_i - r_i)^2}}{\delta_i}$$

where $t_i$ is the ith DCT coefficient in the array T based on the actuation signal time series t(x), $r_i$ is the ith DCT coefficient in the array R based on the sensor response time series r(x), $\delta_i$ is the standard deviation of the ith DCT coefficients, and N is the number of DCT coefficients in each array T and R. Low values of the similarity metric d(T, R) indicate a greater similarity, whereas high values of the similarity metric d (T, R) indicate a lesser similarity.

Process 1000 is shown to include establishing a device pairing between an actuation device and a sensor based on the similarity between the corresponding time series (step 1010). The actuation device in step 1010 may be the specific actuation device to which the actuation signal t(x) is provided, whereas the sensor in step 1010 may be the specific sensor from which the sensor response signal r(x) is received. In some embodiments, step 1010 includes comparing the similarity metric d(T, R) calculated in step 1008 to a threshold value. Step 1010 can include generating a device pairing between the sensor and the actuation device if the similarity metric d(T, R) is less than the threshold value (e.g., d(T, R)<threshold). The threshold value can be a predefined value or a calculated value (e.g., a standard deviation of the DCT coefficients).

In some embodiments, the threshold value is a similarity metric between the actuation signal time series t(x) and a baseline (e.g., average) sensor signal time series a(x) over a predetermined time period. The baseline sensor signal time series a(x) can indicate the average sensor response from the sensor before the actuation signal is applied to the actuation device (e.g., baseline sensor readings), whereas the sensor response time series r(x) can indicate the sensor response from the same sensor after the actuation signal is applied to the actuation device. If the actuation device affects the sensor, the actuation signal time series t(x) is expected to be more similar to the sensor response time series r(x) than the baseline sensor signal time series a(x). Accordingly, the similarity metric d(T, R) between the actuation signal time series t(x) and the sensor response time series r(x) is expected to be lower (i.e., more similar) than the similarity metric d(T, A) between the actuation signal time series t(x) and the baseline sensor signal time series a(x).

In some embodiments, step 1010 includes generating DCT coefficients and compressed DCT coefficients for each baseline sensor signal time series a(x), sensor response time series r(x), and actuation signal time series t(x). Step 1010 can include calculating a similarity metric d(T, R) between the actuation signal time series t(x) and the sensor response time series r(x) associated with the temperature sensor. Step 1010 can also include calculating a baseline similarity metric d(T, A) between the actuation signal time series t(x) and baseline sensor signal time series a(x) associated with the same temperature sensor. Step 1010 can include generating a device pairing between the sensor and the actuation device if the similarity metric d(T, R) for the combination of the sensor and the actuation device indicates a greater similarity (e.g., a lower similarity metric) than the baseline similarity metric d(T, A) for the sensor and the actuation device.

In some embodiments, step 1010 includes comparing the similarity metrics d(T, R) calculated for the actuation device in combination with each of a plurality of sensors. Each similarity metric d(T, R) indicates the similarity (i.e., the closeness) between the actuation signal time series t(x) associated with the actuation device and the sensor response time series r(x) associated with one of the sensors. For example, the similarity metric $d(T_1, R_1)$ may indicate the similarity between the actuation device and a first sensor of the plurality of sensors (corresponding to array $R_1$), whereas the similarity metric $d(T_1, R_2)$ may indicate the similarity between the actuation device and a second sensor of the plurality of sensors (corresponding to array $R_2$).

Step 1010 can include identifying all of the similarity metrics associated with the actuation device (e.g., $d(T_1, R_1), \ldots, d(T_1, R_p)$, where P is the total number of sensors and/or sensor response time series r(x)). In some embodiments, step 1010 includes determining which of the identified similarity metrics is the lowest. The lowest similarity metric may indicate the closest match between the actuation signal time series t(x) associated with the actuation device and the sensor response time series r(x) associated with one of the sensors. In other embodiments, step 1010 can include determining which of the identified similarity metrics is the highest. For example, other techniques for calculating the similarity metric may produce larger similarity metrics when two time series match more closely. Regardless of how the similarity metric is calculated, step 1010 can include identifying the similarity metric which indicates the closest match between the actuation signal time series t(x) and the corresponding sensor response time series r(x).

If the actuation device has the same similarity metric with multiple sensors (e.g., $d(T_1, R_1)=d(T_1, R_2)$), step 1010 can include examining the time delay Δw between the actuation signal time series t(x) associated with the actuation device and sensor response time series r(x) associated with each of the sensors. The time delay Δw may indicate the delay between the time $w_1$ at which the actuation signal is applied to the actuation device and the time $w_2$ at which the effects of the actuation signal are evident in each sensor response (e.g., $\Delta w = w_2 - w_1$). Step 1010 can include identifying the sensor and/or sensor response time series r(x) with the lowest time delay Δw relative to the actuation signal time series t(x).

Still referring to FIG. 10, process 1000 is shown to include using the device pairing to generate and provide control signals to the actuation device (step 1012). Step 1012 can include using the device pairing to create a feedback control loop for HVAC system 600. The feedback control loop can receive a feedback signal from the identified sensor and can provide a control signal to the actuation device. Step 1012 can include using the device pairing to define the sensor and actuation device in the control loop. For example, step 1012 can include creating a control loop which receives a feedback signal from the sensor in the device pairing and provides a control signal to the actuation device in the device pairing. Step 1012 can include mapping the sensor readings from the sensor in the device pairing to the feedback signal in the control loop. Similarly, step 1012 can include mapping the actuation signals provided to the actuation device in the device pairing to the control signal in the control loop.

Step 1012 can include using the feedback control loop to generate actuation signals for the actuation device. Step 1012 can include using state-based algorithms, extremum seeking control (ESC) algorithms, proportional-integral (PI) control algorithms, proportional-integral-derivative (PID) control algorithms, model predictive control (MPC) algorithms, or any other type of control methodology to generate the actuation signals for the actuation device based on the sensor readings. For example, if the sensor reading from the sensor indicates that the temperature of a particular building zone is below a temperature setpoint for the building zone, step 1012 can include providing an actuation signal to the actuation device to increase the amount of heating provided to the building zone. Advantageously, process 1000 can be performed to automatically establish relationships between various actuation devices and sensors based on the device pairings to allow controller 602 to determine which of the actuation devices can be operated to affect a given sensor reading.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system for a building, the building system comprising one or more memory devices configured to store instructions thereon that, when executed by one or more processors, cause the one or more processors to:
   operate an actuation device of the building to affect a variable of the building;
   generate an actuation data time series indicating operation of the actuation device;
   receive a plurality of sensor response signals from a plurality of sensors, the plurality of sensor response signals indicating an effect of the operation of the actuation device;
   generate a plurality of sensor data time series based on the plurality of sensor response signals;
   perform a time series analysis on the actuation data time series and the plurality of sensor data time series, wherein performing the time series analysis includes:
      determining a plurality of delay times based on the plurality of sensor data time series and the actuation data time series, each of the plurality of delay times being a delay time between a sensor of the plurality of sensors and the actuation device; and
      identifying one sensor of the plurality of sensors associated with the actuation device by identifying a minimum delay time of the plurality of delay times; and
   establish a device pairing comprising the actuation device and the one sensor of the plurality of sensors based on the time series analysis.

2. The building system of claim 1, wherein the device pairing defines a control relationship between the actuation device in the device pairing and the one sensor of the plurality of sensors;
   wherein the control relationship indicates that the actuation device in the device pairing is operable to control a variable measured by the one sensor of the plurality of sensors in the device pairing.

3. The building system of claim 1, wherein the instructions cause the one or more processors to:
   create a feedback control loop comprising the actuation device in the device pairing and the one sensor of the plurality of sensors in the device pairing; and
   use the feedback control loop to generate and provide control signals to the actuation device based on measurements received from the one sensor of the plurality of sensors.

4. The building system of claim 1, wherein the building system is a heating, ventilation, and air conditioning (HVAC) system comprising:
   the actuation device configured to control the variable in the building;
   the plurality of sensors configured to measure the variable; and
   a building controller communicably coupled to the actuation device and the plurality of sensors, wherein the building controller includes the one or more memory devices and the one or more processors.

5. The building system of claim 1, wherein the instructions cause the one or more processors to:
   detect a dimensional mismatch between the actuation data time series and a particular sensor data time series; and
   correct the dimensional mismatch by modifying at least one of the actuation data time series and the particular sensor data time series.

6. The building system of claim 1, wherein the instructions cause the one or more processors to:
   receive baseline sensor signals from each of the plurality of sensors, the baseline sensor signals indicating values of the variable during a time period before the operation of the actuation device; and
   for each of the baseline sensor signals, calculate a baseline similarity metric indicating a baseline similarity between one of the baseline sensor signals and the actuation device.

7. A method of a building for pairing building devices, the method comprising:
   operating, by one or more processing circuits, an actuation device of the building to affect a variable of the building;
   generating, by the one or more processing circuits, an actuation data time series indicating operation of the actuation device;
   receiving, by the one or more processing circuits, a plurality of sensor response signals from a plurality of sensors, the plurality of sensor response signals indicating an effect of the operation of the actuation device;
   generating, by the one or more processing circuits, a plurality of sensor data time series based on the plurality of sensor response signals;
   performing, by the one or more processing circuits, a time series analysis on the actuation data time series and the plurality of sensor data time series, wherein performing the time series analysis includes:
      detecting a dimensional mismatch between the actuation data time series and a particular sensor data time series; and
      correcting the dimensional mismatch by modifying at least one of the actuation data time series and the particular sensor data time series; and
   establishing, by the one or more processing circuits, a device pairing comprising the actuation device and one sensor of the plurality of sensors based on the time series analysis.

8. The method of claim 7, wherein the device pairing defines a control relationship between the actuation device in the device pairing and the one sensor of the plurality of sensors;
wherein the control relationship indicates that the actuation device in the device pairing is operable to control a variable measured by the one sensor of the plurality of sensors in the device pairing.

9. The method of claim 7, further comprising:
creating a feedback control loop comprising the actuation device in the device pairing and the one sensor of the plurality of sensors in the device pairing; and
using the feedback control loop to generate and provide control signals to the actuation device based on measurements received from the one sensor of the plurality of sensors.

10. The method of claim 7, wherein performing, by the one or more processing circuits, the time series analysis comprises:
determining one or more sensor coefficients for each of the plurality of sensors based on the plurality of sensor data time series;
determining one or more actuation device coefficients based on the actuation data time series; and
identifying the one sensor of the plurality of sensors associated with the actuation device based on the one or more sensor coefficients and the one or more actuation device coefficients.

11. The method of claim 10, wherein performing, by the one or more processing circuits, the time series analysis comprises:
determining the one or more sensor coefficients for each of the plurality of sensors and the one or more actuation device coefficients by applying a discrete cosine transformation (DCT) to each of the plurality of sensor data time series and to the actuation data time series, each DCT generating a plurality of DCT coefficients, wherein one or more actuation device DCT coefficients resulting from the DCT of the actuation data time series are the one or more actuation device coefficients and one or more sensor DCT coefficients resulting from the DCT of each of the plurality of sensor data time series are the one or more sensor coefficients; and
generating one or more quantized sensor DCT coefficients for each of the plurality of sensors by quantizing the one or more sensor DCT coefficients resulting from the DCT of each of the plurality of sensor data time series and generate one or more quantized actuator DCT coefficients by quantizing the one or more actuation device DCT coefficients resulting from the DCT of the actuation data time series.

12. The method of claim 10, wherein performing, by the one or more processing circuits, the time series analysis comprises:
generating one or more quantized sensor coefficients for each of the plurality of sensors by quantizing the one or more sensor coefficients of each of the plurality of sensors and generating one or more quantized actuation device coefficients by quantizing the one or more actuation device coefficients;
for each of the plurality of sensor response signals, calculating a plurality of similarity metrics indicating a similarity between the plurality of sensors and the actuation device based on the one or more quantized sensor coefficients and the one or more quantized actuation device coefficients; and
identifying the one sensor of the plurality of sensors associated with the actuation device based on the plurality of similarity metrics.

13. One or more non-transitory computer readable storage media configured to store instructions thereon that, when executed by one or more processors, cause the one or more processors to:
operate an actuation device of a building to affect a variable of the building;
generate an actuation data time series indicating operation of the actuation device;
receive a plurality of sensor response signals from a plurality of sensors, the plurality of sensor response signals indicating an effect of the operation of the actuation device;
generate a plurality of sensor data time series based on the plurality of sensor response signals;
perform a time series analysis on the actuation data time series and the plurality of sensor data time series, wherein performing the time series analysis includes:
determining one or more sensor coefficients for each of the plurality of sensors based on the plurality of sensor data time series;
determining one or more actuation device coefficients based on the actuation data time series; and
identifying the one sensor of the plurality of sensors associated with the actuation device based on the one or more sensor coefficients and the one or more actuation device coefficients; and
establish a device pairing comprising the actuation device and the one sensor of the plurality of sensors based on the time series analysis.

14. The one or more non-transitory computer readable storage media of claim 13, wherein the device pairing defines a control relationship between the actuation device in the device pairing and the one sensor of the plurality of sensors;
wherein the control relationship indicates that the actuation device in the device pairing is operable to control a variable measured by the one sensor of the plurality of sensors in the device pairing.

15. The one or more non-transitory computer readable storage media of claim 13, wherein the instructions, when executed by the one or more processors, cause the one or more processors cause the one or more processors to:
create a feedback control loop comprising the actuation device in the device pairing and the one sensor of the plurality of sensors in the device pairing; and
use the feedback control loop to generate and provide control signals to the actuation device based on measurements received from the one sensor of the plurality of sensors.

* * * * *